United States Patent
Asano et al.

(10) Patent No.: US 8,136,344 B2
(45) Date of Patent: Mar. 20, 2012

(54) FUEL CONTROL DEVICE AND FUEL CONTROL METHOD

(75) Inventors: Seiji Asano, Hitachinaka (JP); Hisahiro Ooba, Hitachinaka (JP); Masahiro Osato, Hitachinaka (JP); Kenji Takada, Hitachinaka (JP); Mitsuru Nagase, Hitachinaka (JP); Hiroshi Sekine, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 936 days.

(21) Appl. No.: 11/945,408

(22) Filed: Nov. 27, 2007

(65) Prior Publication Data

US 2008/0133115 A1 Jun. 5, 2008

(30) Foreign Application Priority Data

Nov. 30, 2006 (JP) ................................. 2006-322749

(51) Int. Cl.
*F01N 3/00* (2006.01)
*F01N 3/10* (2006.01)

(52) U.S. Cl. ................. 60/284; 60/285; 60/299; 60/303

(58) Field of Classification Search .................... 60/284, 60/285, 286, 299, 303; 123/406.44, 406.55; 701/113

See application file for complete search history.

(56) References Cited

U.S. PATENT DOCUMENTS

| | | | | |
|---|---|---|---|---|
| 5,201,802 | A * | 4/1993 | Hirota et al. | 60/276 |
| 6,408,816 | B1 * | 6/2002 | Tomita et al. | 123/295 |
| 2002/0023431 | A1 * | 2/2002 | Takemura et al. | 60/284 |

FOREIGN PATENT DOCUMENTS

| | | | |
|---|---|---|---|
| JP | 7-54644 | A | 2/1995 |
| JP | 9-72213 | A | 3/1997 |
| JP | 10-169434 | A | 6/1998 |
| JP | 11-132027 | A | 5/1999 |
| JP | 2002-266688 | A | 9/2002 |
| JP | 2006-220020 | A | 8/2006 |
| WO | WO 2007031822 | A1 * | 3/2007 |

OTHER PUBLICATIONS

Yokoi, Machine Translation of JP 2006-220020 A, Aug. 24, 2006.*
Masahiro Yokoi, Formal Translation of JP 2006-220020 A, Aug. 24, 2006, translation performed by Schreiber Translations Inc., Nov. 2011.*
Japanese Office Action dated May 12, 2009 with English translation (Four (4) pages).
Japanese Office Action dated Oct. 13, 2009 with English translation (Four (4) pages).

* cited by examiner

*Primary Examiner* — Thomas Denion
*Assistant Examiner* — Audrey K Bradley
(74) *Attorney, Agent, or Firm* — Crowell & Moring LLP

(57) ABSTRACT

At the start-up of an engine, the ignition timing and the air-fuel ratio are controlled to prevent overload onto the volume of ISC air and decreased torque and torque difference.
The fuel condition based on the amount of ignition timing correction to inhibit rotational fluctuation during idling is determined and the fuel quantity based on the result is corrected.
Right after an engine has started and until a pilot burner is created in the heat spot of the catalyst, the ignition retard control is mainly executed, and at the time when it is determined that a pilot burner has been created in the catalyst's heat spot, the lean air-fuel ratio control is to be executed instead of the ignition retard control. Furthermore, when the ignition retard control changes to the lean air-fuel ratio control, the state transition control is executed along the equivalent ISC air volume line so as not to cause torque fluctuation.

12 Claims, 28 Drawing Sheets

FIG. 5  *Prior Art*

FUEL CONTROL DEVICE AND FUEL CONTROL METHOD

CLAIM OF PRIORITY

The present application claims priority from Japanese application serial No. 2006-322749, filed on Nov. 30, 2006, the content of which is hereby incorporated by reference into this application.

FIELD OF THE INVENTION

The present invention relates to a fuel control device for engine and a method of accelerating the catalyst quick light-off (or ignition) at the engine start-up and controlling an air-fuel ratio to inhibit the discharge of unburned fuel.

BACKGROUND OF THE INVENTION

In conventional technology, as shown in Japanese Patent Laid-open No. 2002-266688, ignition timing is delayed to execute the catalyst quick light-off at the cold start-up and the ISC gate opening is made larger than usual. When the shift range moves to the D range, the ignition timing is moved to the normal side, and associated torque fluctuation is to be absorbed by reducing the ISC gate opening so as to reduce the volume of intake air.

In another conventional technology, as shown in Japanese Patent Laid-open No. Hei 10(1998)-169434, oxygen is supplied through a secondary air inlet provided on an exhaust pipe until the catalyst is activated.

SUMMARY OF THE INVENTION

The purpose of the present invention is to enable a quick catalyst light-off with the least amount of idle speed control (ISC) air. In the first conventional technology, delay of the ignition timing is described; however, the reason for this delay is for the exhaust gas temperature to rise, and the supply of oxygen necessary for activating the catalyst is not described. In the latter conventional technology, delay of the ignition timing is not described; only by directing secondary air into an exhaust pipe will the exhaust gas temperature be reduced due to the outer air temperature, and the catalyst light-off may be delayed.

In the present invention, at the beginning after start-up and until the heat spot, which is to become a pilot burner for the catalyst, is ignited, the ignition timing is set on the delay-side and the air-fuel ratio is set at a normal air-fuel ratio so as to raise the exhaust gas temperature, and when the system determines that the heat spot has been ignited, the ignition timing is set to the normal ignition timing and the air-fuel ratio is set to the lean air-fuel ratio, thereby supplying oxygen to the catalyst. The state transition from the ignition delay-led state to the air-fuel ratio-led state is executed along the equivalent ISC air volume line. Whether or not the heat spot has been ignited is determined by the prescribed elapsed time, an integrated value of the volume of intake air, the measured catalyst temperature, or a degree of activation of the oxygen concentration sensor.

Because the delay of the ignition timing is not executed at the same time as the lean air-fuel ratio, an engine's torque output does not decrease much resulting in the reduction of the volume of ISC air. Accordingly, the amount of unburned fuel gas discharged decreases and mileage is improved. Because the state transition from the ignition delay-led state to the air-fuel ratio-led state is executed along the equivalent ISC air volume line, torque fluctuation associated with the state transition does not occur, therefore, there is no rotational fluctuation of an engine.

DESCRIPTION OF THE PREFERRED EMBODIMENTS

A fuel control device for engine with catalyst quick light-off method to solve the problem comprises a means for providing exhaust heat for the catalyst in an exhaust pipe by delaying the ignition, and a means for providing oxygen for the catalyst in an exhaust pipe by making an air-fuel ratio lean, wherein the ignition timing at the warm-up period after an engine has started includes the normal ignition timing and the delay-side ignition timing with respect to the normal ignition timing;

the air-fuel ratio applied after an engine has started includes the normal air-fuel ratio and the lean air-fuel ratio with respect to the normal air-fuel ratio; and the delay-side ignition timing and the normal air-fuel ratio are used for driving right after an engine has started and until the spot, which is to become a pilot burner for the catalyst, is determined to be ignited, and after it is determined that the spot, which is to become a pilot burner for the catalyst, has been ignited, the operating state changes to prevent fluctuation of engine torque, and the normal ignition timing and the lean air-fuel ratio are used for driving until the catalyst is activated.

Figure 1:
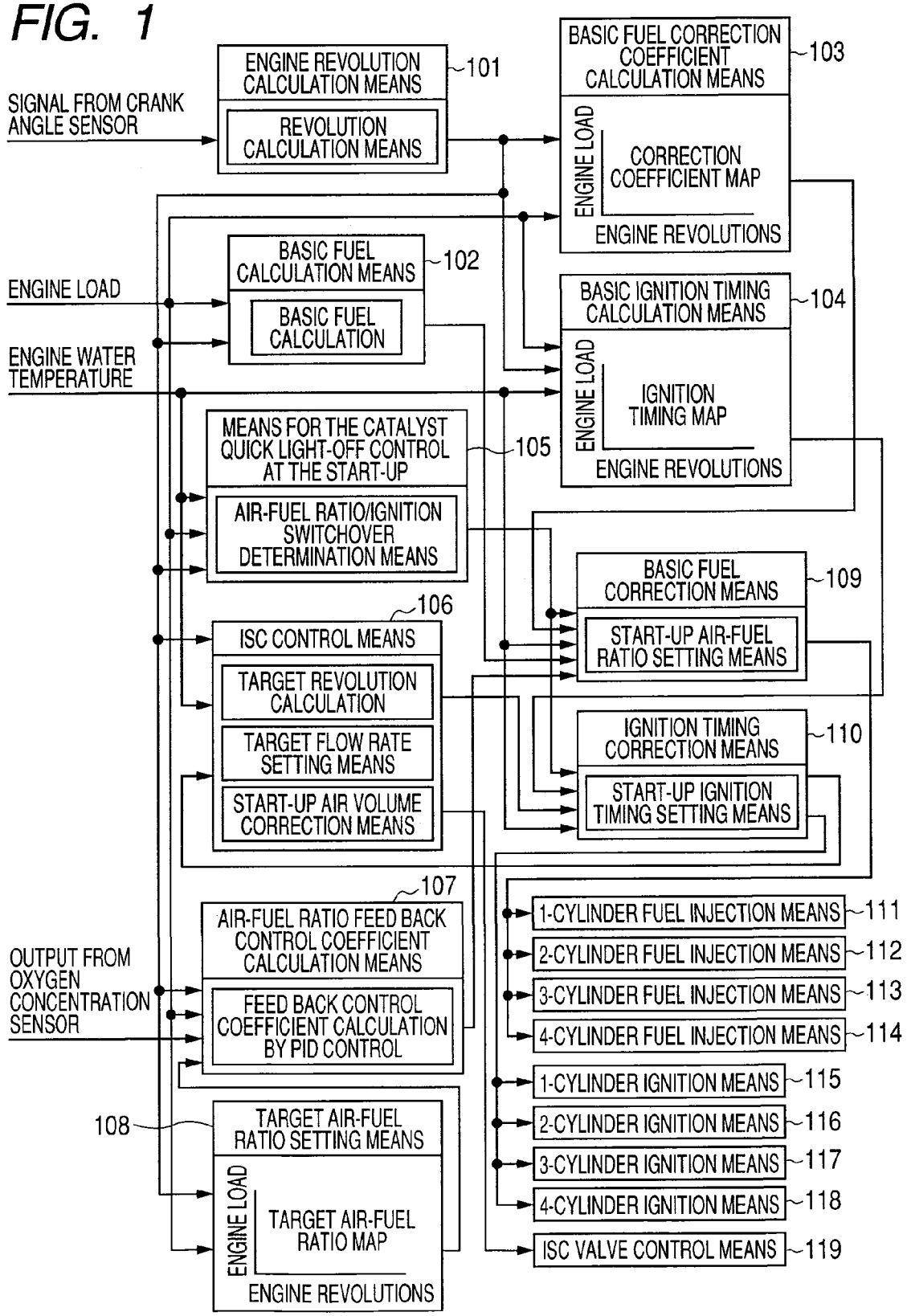
FIG. 1 shows an example of a control block of a fuel control device according to the present invention.

Hereafter, a major embodiment according to the present invention will be described with reference to the drawings. FIG. 1 shows an example of a control block of a fuel control device with catalyst quick light-off method according to the present invention. Block 101 is a block of an engine revolution calculation means. Electrical signals from a crank angle sensor located at an engine's prescribed crank angle position, mainly the number of pulse signal fluctuation inputs per unit time are counted and calculated, thereby an engine's revolutions per unit time are calculated. Block 102 calculates the amount of basic fuel required by an engine in each area by using, as engine loads, the engine's revolutions calculated by the block 101, the intake pipe pressure detected by the sensor disposed in the engine's intake pipe, or the engine's intake air volume measured by an air flowmeter located on the upstream-side of the throttle valve. Block 103 calculates a correction coefficient of basic fuel calculated by the block 102 for each of the engine's drive areas by using the engine's revolutions calculated by the block 101 and the above-mentioned engine loads. Based on the above-mentioned engine revolutions and engine loads, block 104 determines the optimal ignition timing in each of the engine's drive areas by means of a map search or the like. To promote a rise in the catalyst temperature, block 105 controls the air-fuel ratio and the ignition timing at the start-up according to timing and control quantity, which will be described later in this document. To make idling engine revolutions constant, block 106 sets the target revolutions for idling and calculates the target flow rate and the amount of correction of the ISC ignition timing for the ISC valve control means. Furthermore, in order to compensate for insufficient torque when the air-fuel ratio and the ignition timing at the start-up are determined by the block 105, block 106 also corrects the volume of air required at the start-up. Block 107 calculates the air-fuel ratio feed back control coefficient based on the output from the oxygen concentration sensor disposed in the engine's exhaust pipe so as to maintain the target air-fuel ratio of the fuel-air mixture supplied to the engine, which will be described later in this document. Moreover, in this embodiment, the above-mentioned oxygen concentration sensor outputs a signal proportional to the exhaust air-fuel ratio; however, the sensor may generate two signals, which are rich-side and lean-side signals, with respect to the theoretical air-fuel ratio.

Block 108 determines an optimal target air-fuel ratio in each of the engine's drive areas by means of a map search or the like according to the above-mentioned engine revolutions and engine loads. The target air-fuel ratio determined by this block is used for the air-fuel ratio feed back control executed by the block 107. Block 109 corrects the amount of basic fuel calculated by the block 102 according to the basic fuel correction coefficient obtained by the block 103, the engine water temperature, the air volume-fuel ratio control at the start-up obtained by the block 105, and the air-fuel ratio feed back control coefficient obtained by the block 107. Block 110 corrects the ignition timing obtained by the block 104 through map search according to the engine condition (transient or steady state) and the amount of ignition timing control at the start-up obtained by the block 105.

Each of the blocks 111 through 114 is a fuel injection means for supplying an engine with the amount of fuel calculated by the block 109. Each of the blocks 115 through 118 is an ignition means for igniting a fuel-air mixture flown into a cylinder according to the engine's request ignition timing corrected by the block 110. The block 119 is a means for driving an ISC valve so that the target flow rate during idling calculated by the block 106 can be achieved.

Figure 2:
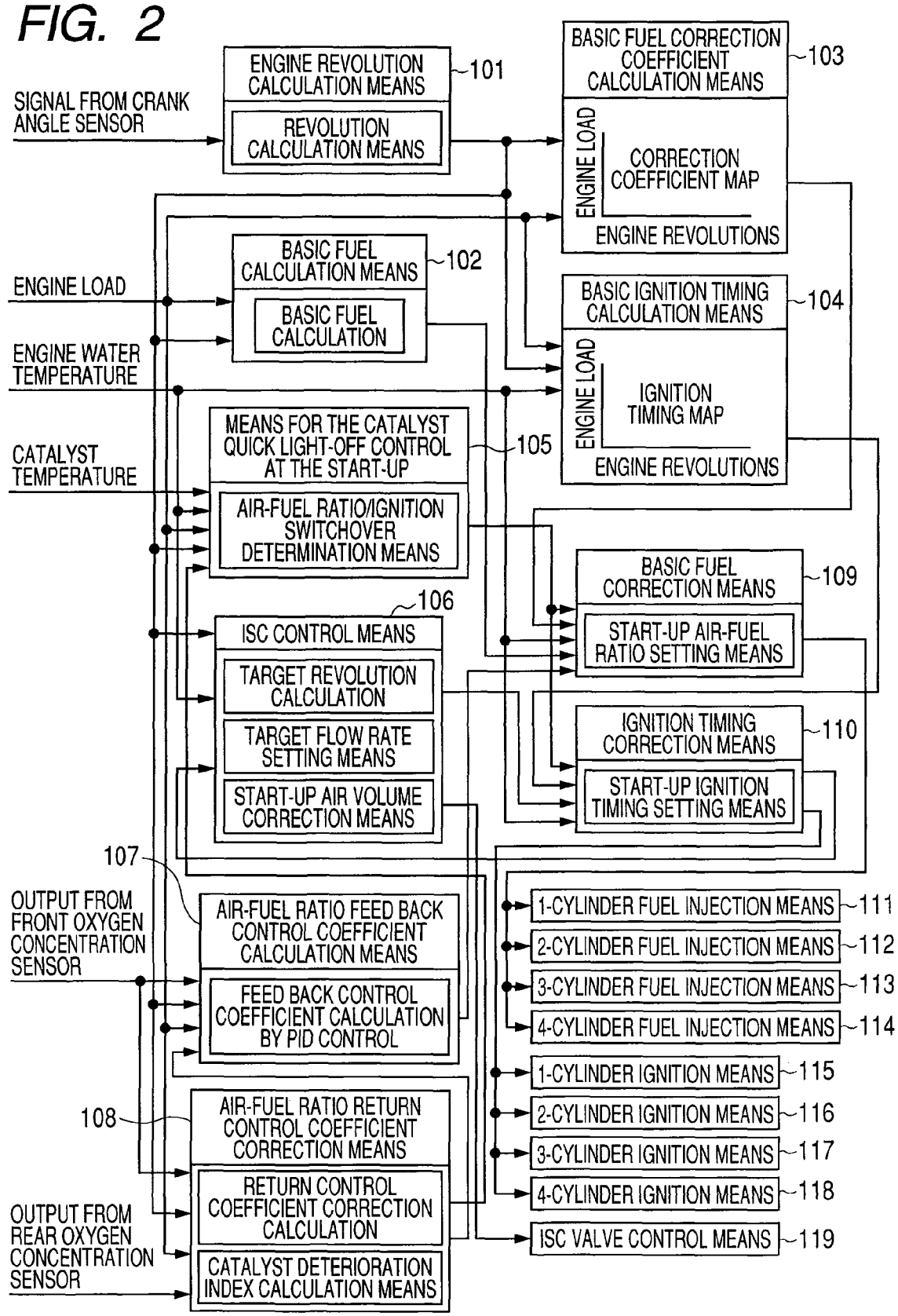
FIG. 2 shows another example of a control block of the fuel control device according to the present invention.

FIG. 2 shows another example of a control block of a fuel control device with catalyst quick light-off method according to the present invention. Differences from the example shown in FIG. 1 are a catalyst temperature is inputted into the block 105, and an output from the rear oxygen concentration sensor is entered into the block 108 so as to allow the oxygen concentration after the catalyst to contribute to the air-fuel ratio feed back control. Furthermore, in this block, the catalyst deterioration index is calculated according to the outputs from the oxygen concentration sensors at the front and rear of the catalyst.

Figure 3:
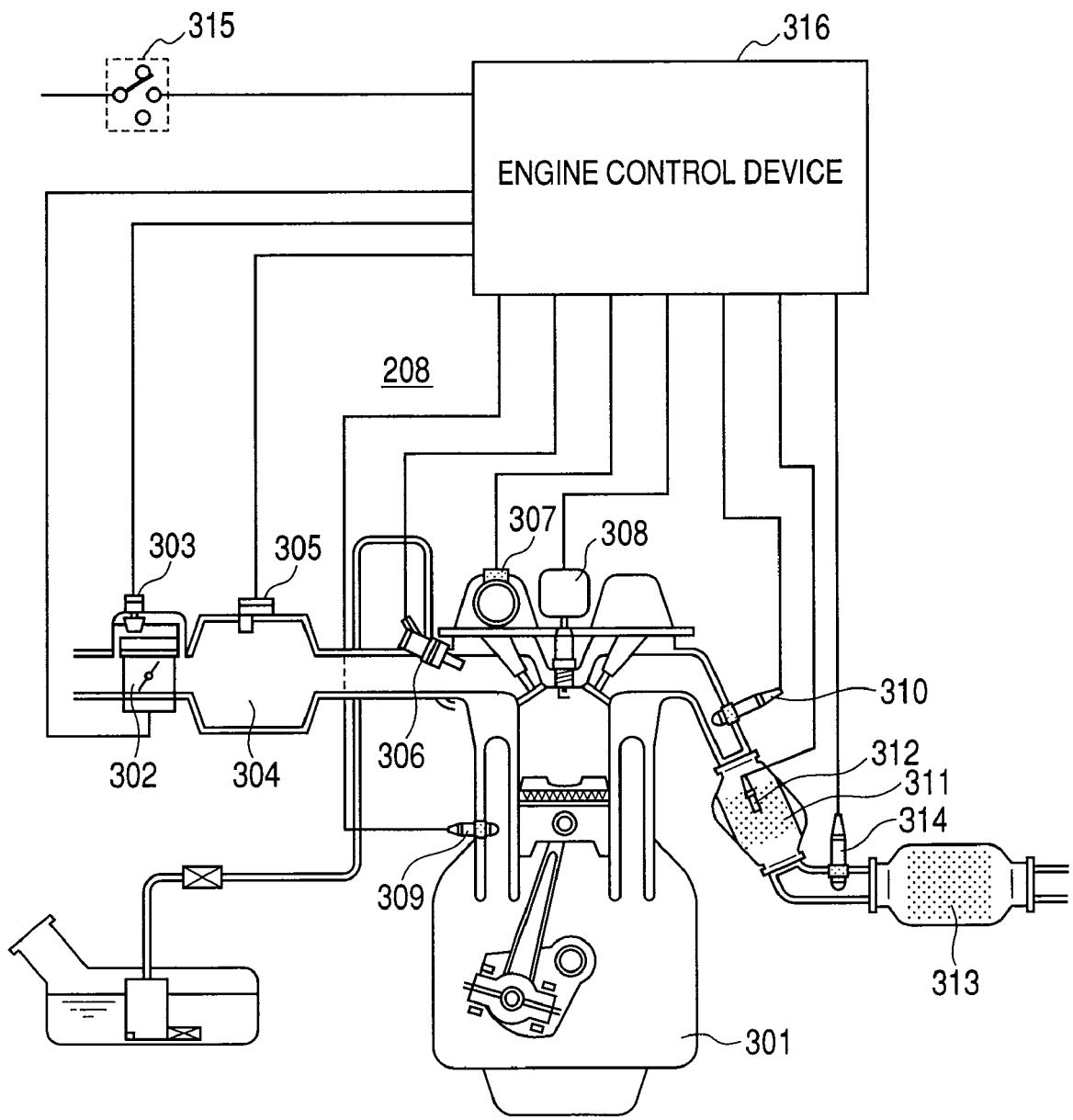
FIG. 3 shows an example of an engine and its surroundings controlled by a fuel control device according to the present invention.

FIG. 3 shows an example of an engine and its surroundings controlled by a fuel control device with catalyst quick light-off method according to the present invention. An engine 301 comprises an idling revolutions control valve 303 for controlling the volume of intake air by a throttle valve 302 and controlling the area of the flow passage connected to the intake pipe 304 that bypasses the throttle valve, thereby controlling the idling engine revolutions, an intake pipe pressure sensor 305 for detecting the pressure in the intake pipe 304, a fuel injection valve 306 for supplying fuel requested by the engine, a crank angle sensor 307 disposed at the engine's prescribed crank angle position, an ignition module 308 for supplying ignition energy to an igniter plug, which ignites a fuel-air mixture supplied in the engine's cylinder, based on the ignition signal emitted by an engine control device 316, a water temperature sensor 309 which is disposed in the engine's cylinder block to detect the engine's cooling water temperature, a front oxygen concentration sensor 310 which is disposed in the engine's exhaust pipe to detect the oxygen concentration in the exhaust gas, a front catalyst 311 disposed close to the engine in the engine's exhaust pipe, a catalyst temperature sensor 312 for measuring temperature of the inside of the front catalyst 311, a rear catalyst 313 disposed rear in the engine's exhaust pipe, a rear oxygen concentration sensor 314 disposed in the exhaust pipe located between the front catalyst 311 and the rear catalyst 313, an ignition key switch 315 which is the main switch for driving and stopping the engine, and an engine control device 316 for controlling the engine's auxiliary devices.

In this embodiment, although an intake pipe pressure sensor 305 is provided to measure the engine load, it is also possible to provide the engine's intake air sensor in front of the throttle valve to measure the volume of intake air and use it as an engine load. Furthermore, the idling engine revolutions is controlled by an idling revolutions control valve 203, and if the throttle valve 202 is controlled by a motor or the like, the idling revolutions control valve 203 is not necessary.

Figure 4:
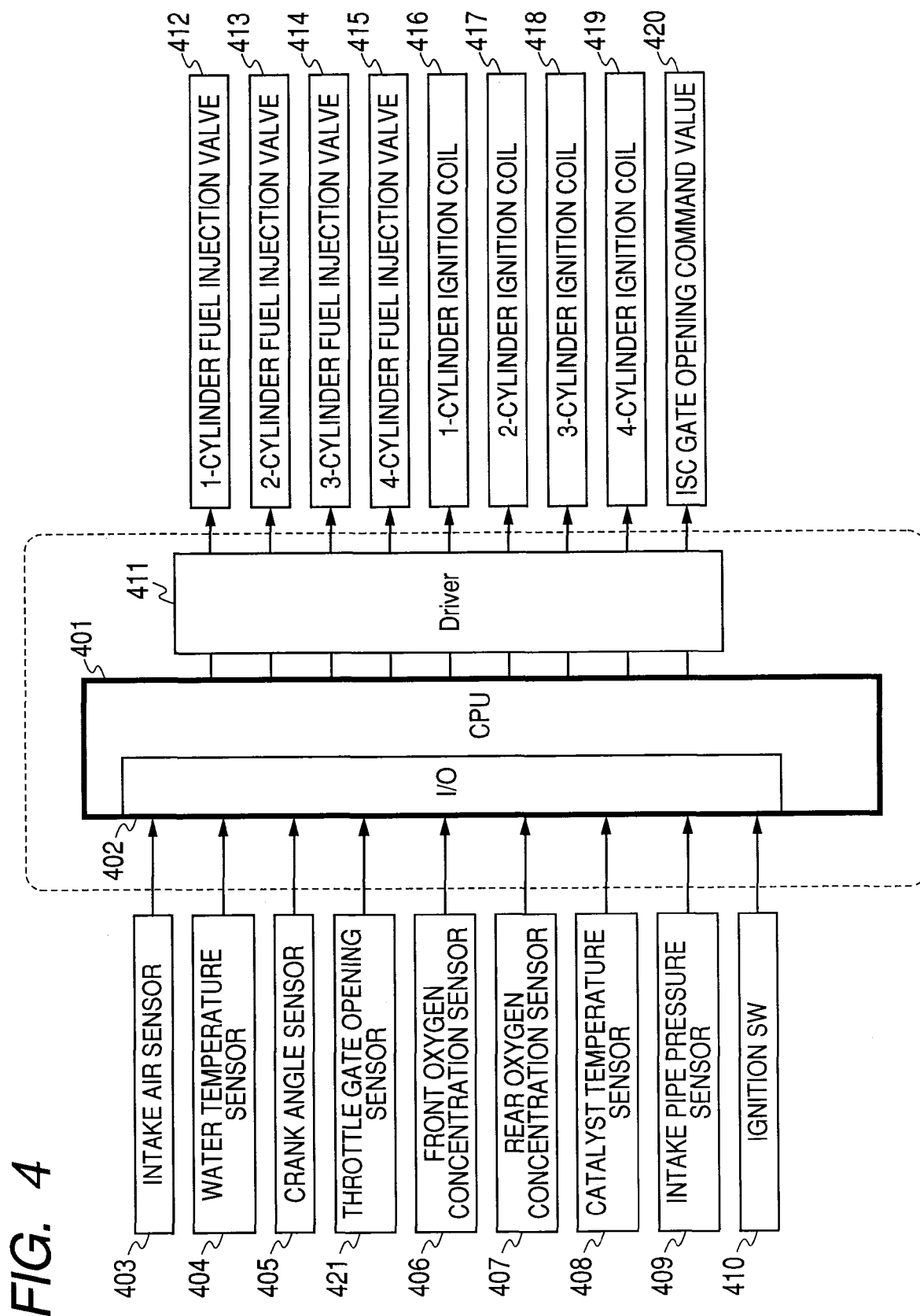
FIG. 4 shows an example of the internal structure of a fuel control device according to the present invention.

FIG. 4 shows an example of the internal structure of a fuel control device with catalyst quick light-off method according to the present invention. Inside the CPU 401, an I/O portion 402 is disposed which converts an electrical signal coming from each sensor located in the engine into a digital signal and converts the digital control signal into an actual actuator drive signal. And, outputs from an intake air sensor 403, water temperature sensor 404, crank angle sensor 405, front oxygen concentration sensor 406, rear oxygen concentration sensor 407, catalyst temperature sensor 408, intake pipe pressure sensor 409, and an ignition SW 410 are entered into the I/O portion 402. Output signals are sent, via an output signal driver 411 from the CPU 401, to the ISC gate opening command part 420 with respect to the fuel injection valves 412 through 415, to ignition coils 416 through 419, and to the ISC valve.

Figure 5:
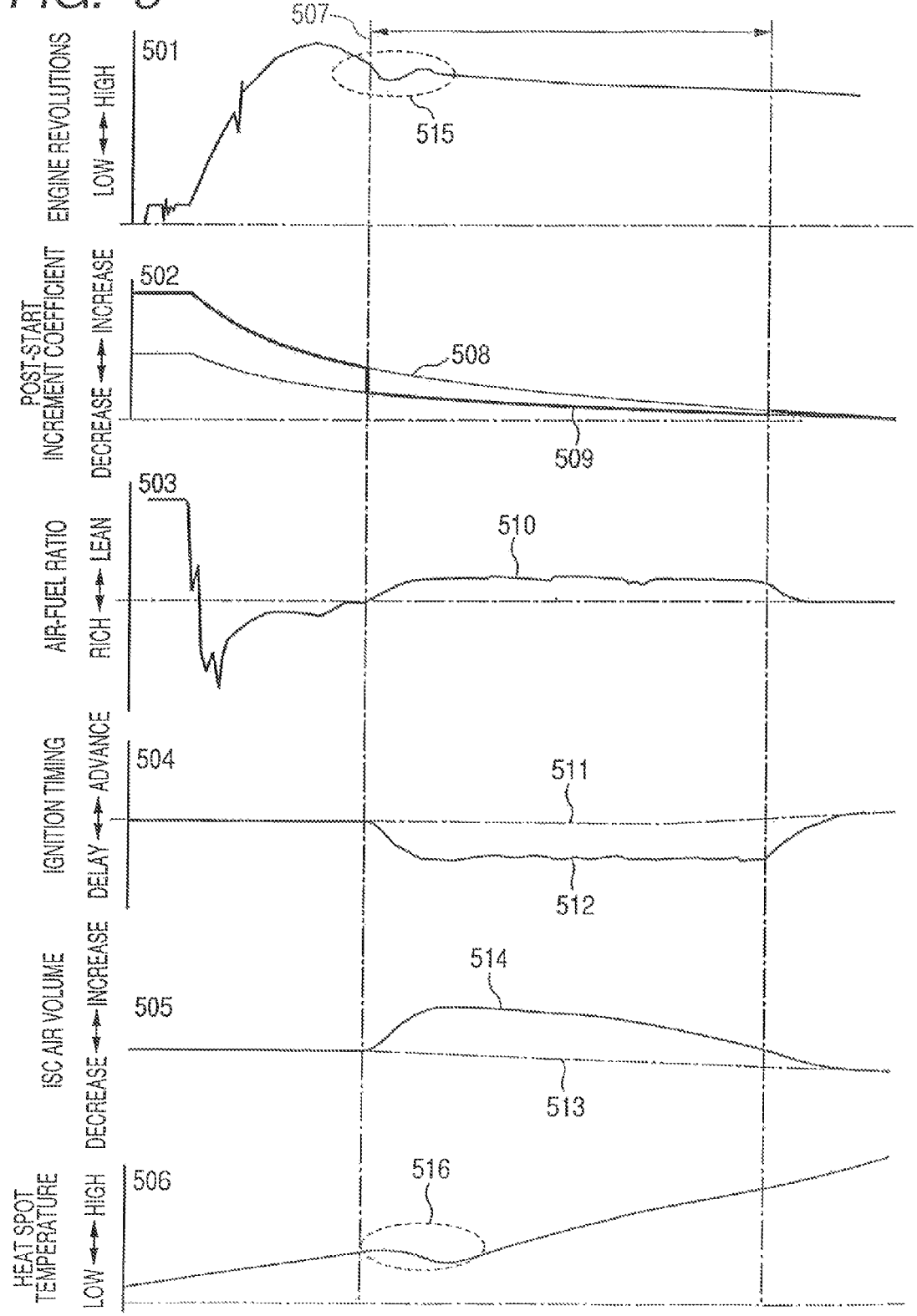
FIG. 5 shows an example of the chart of the catalyst quick light-off control executed by a conventional fuel control device.

FIG. 5 shows an example of the chart of the catalyst quick light-off control at the start-up executed by a conventional fuel control device. Chart 501 shows the behavior of the engine revolutions at the start-up; chart 502 shows the control behavior of fuel's post-start increment coefficient; chart 503 shows the behavior of the air-fuel ratio; chart 504 shows the behavior of the ignition timing control; and chart 506 shows the behavior of the catalyst heat spot's temperature rise. At timing 507, the catalyst quick light-off control at the start-up is started. The post-start increment coefficient switches to the lean increment coefficient 509 with regard to the normal increment coefficient 508. By doing so, the air-fuel ratio is changed to the lean air-fuel ratio shown in chart 510. The ignition timing is switched to the delayed ignition timing 512 with regard to the normal ignition timing 511. The volume of ISC air is increased, as shown in chart 514, with respect to the normal air volume 513 to compensate for decreased torque due to the lean air-fuel ratio and the delayed ignition timing. In this example, from timing 507 at which the conventional catalyst quick light-off control started, the catalyst heat spot's temperature decrease 516 has occurred due to the decrease of the engine revolutions 515 caused by decreased torque and the exhaust gas temperature decrease caused by the lean air-fuel ratio.

Figure 6:
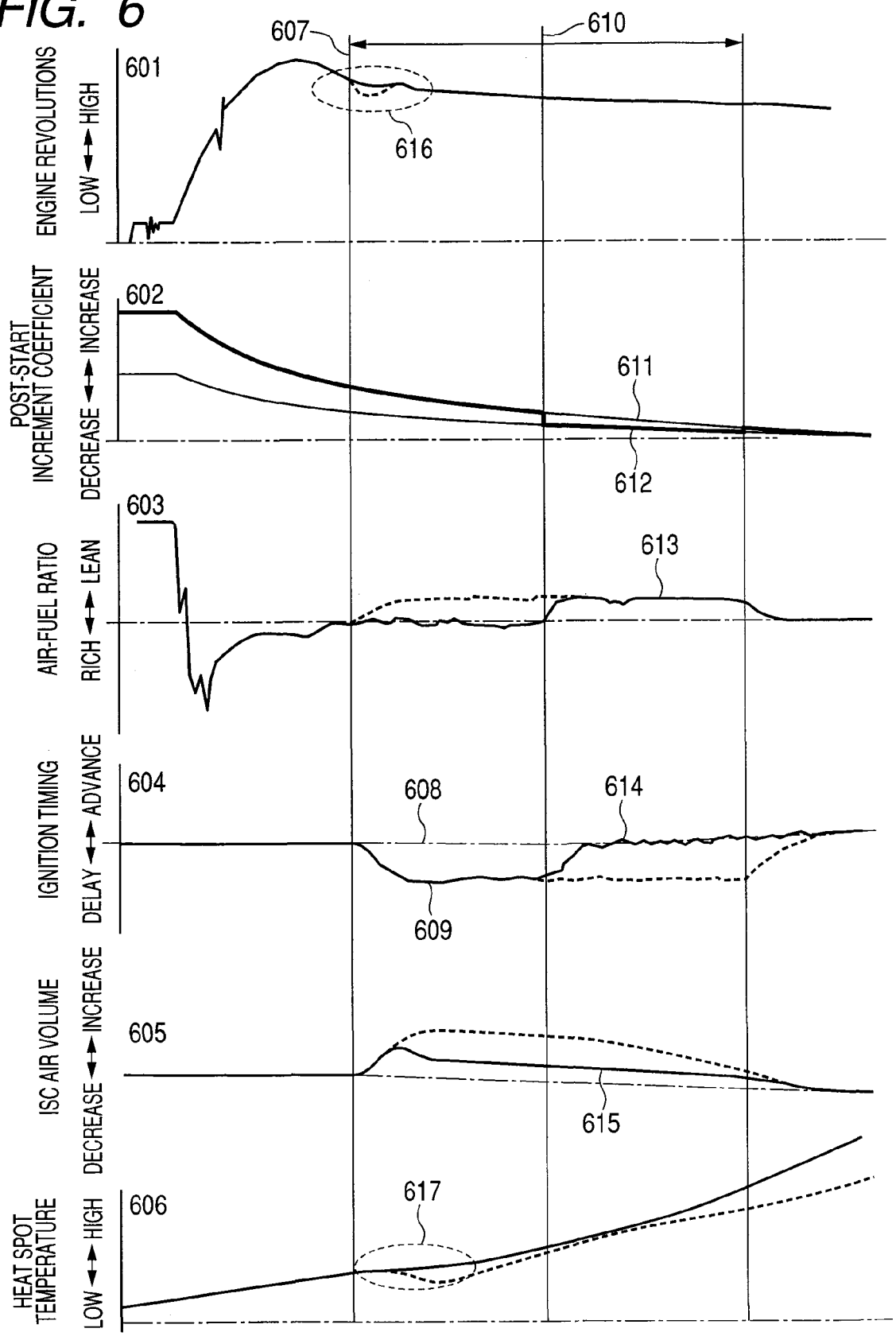
FIG. 6 shows an example of the chart of the catalyst quick light-off control executed by a fuel control device according to the present invention.

FIG. 6 shows an example of the catalyst quick light-off control executed by a fuel control device with catalyst quick light-off method according to the present invention. In the same manner as the above-mentioned example shown in FIG. 5, chart 601 shows the behavior of the engine revolutions at the start-up; chart 602 shows the control behavior of fuel's post-start increment coefficient; chart 603 shows the behavior of the air-fuel ratio; chart 604 shows the behavior of the ignition timing control; and chart 606 shows the behavior of the catalyst heat spot's temperature rise. At timing 607, the catalyst quick light-off control at the start-up is started. The ignition timing is switched to the delayed ignition timing 609 with regard to the normal ignition timing 608. Next, at timing 610, the post-start increment coefficient is switched to the lean increment coefficient 612 with regard to the normal increment coefficient 611. By doing so, the air-fuel ratio is changed to the lean air-fuel ratio shown in chart 613. Furthermore, the ignition timing is switched from the delay-side ignition timing 609 to the normal ignition timing 614. In this example, because the lean catalyst quick light-off control is not executed at the same time as the delayed ignition, the amount of ISC air does not increase much due to decreased torque (chart 615). Therefore, at timing 607 at which the catalyst quick light-off control starts, the engine revolutions does not drop (chart 616) and the lean air-fuel ratio is not provided when the ignition timing is delayed; accordingly, the catalyst's heat spot temperature does not decrease (chart 617).

Figure 7:
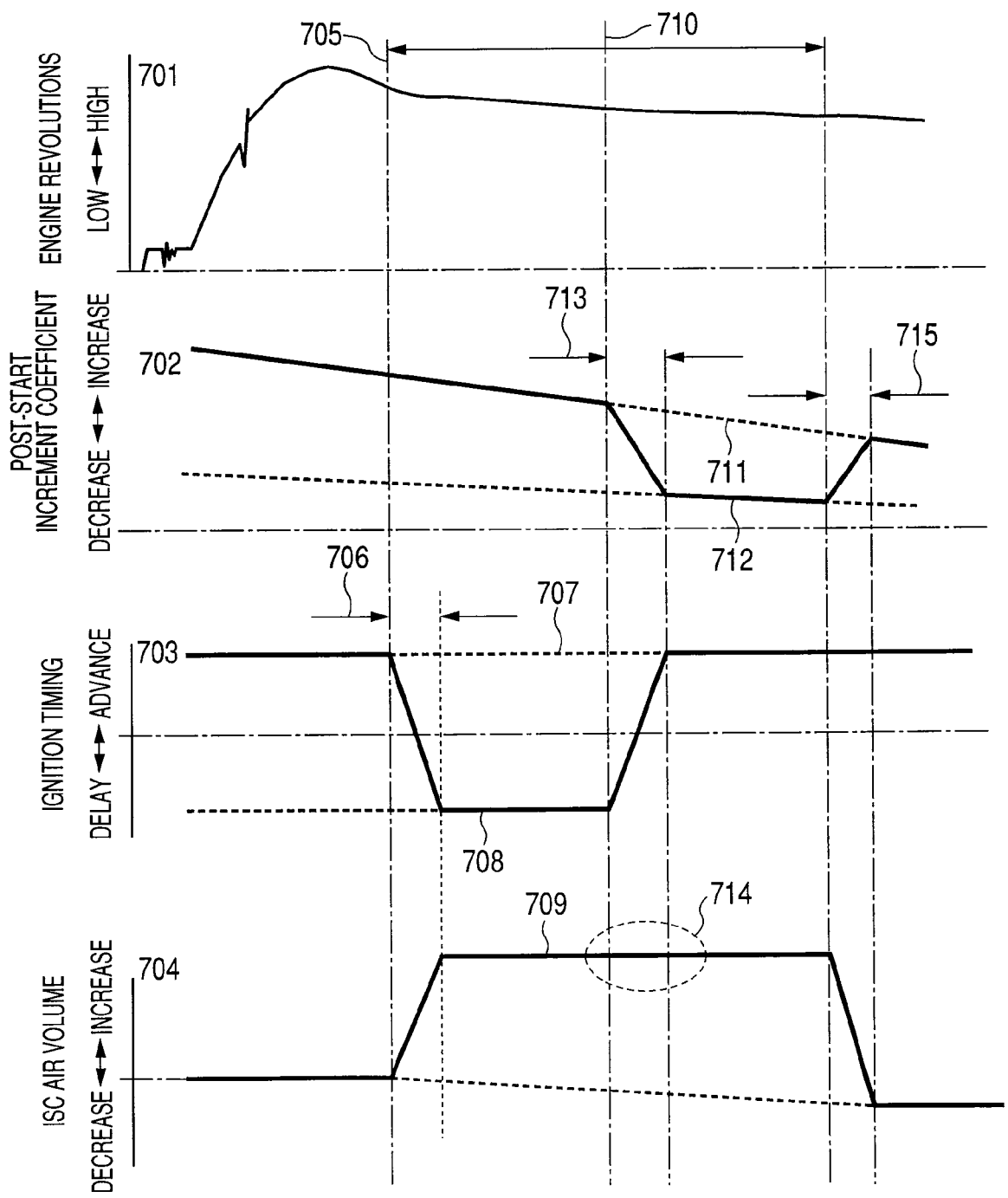
FIG. 7 shows an example of the fuel and the air-fuel ratio set for a fuel control device according to the present invention at the start-up.

FIG. 7 shows an example of the fuel and the air-fuel ratio set for a fuel control device with catalyst quick light-off method according to the present invention. Chart 701 shows the behavior of the engine revolutions at the start-up; chart 702 shows the setting of fuel's post-start increment coefficient; chart 703 shows the setting of the ignition timing; and chart 704 shows the setting of the volume of ISC air. At timing 705 when the catalyst quick light-off control at the start-up is started, the ignition timing gradually changes from the normal ignition timing 707 to the delay-side ignition timing 708 through a transitional period 706. In the same manner, the volume of ISC air gradually changes to the increment-side 709. Next, at timing 710, the post-start increment coefficient changes from the normal increment coefficient 711 to the lean increment coefficient 712 through a transitional period 713. At the same time, the ignition timing gradually changes from the delay-side ignition timing 708 to the normal ignition timing 707. At this point, the degree of the ignition and the air-fuel ratio is determined by engine torque. The delay-side ignition timing and the lean increment coefficient are determined so that torque fluctuation will not occur at timing 710.

By such an arrangement, the volume of ISC air does not need to be changed at timing 710 (area 714). When the catalyst quick light-off control at the start-up has finished, the post-start increment coefficient and the volume of ISC air are gradually changed to the normal values through a transitional period 715.

Figure 8:
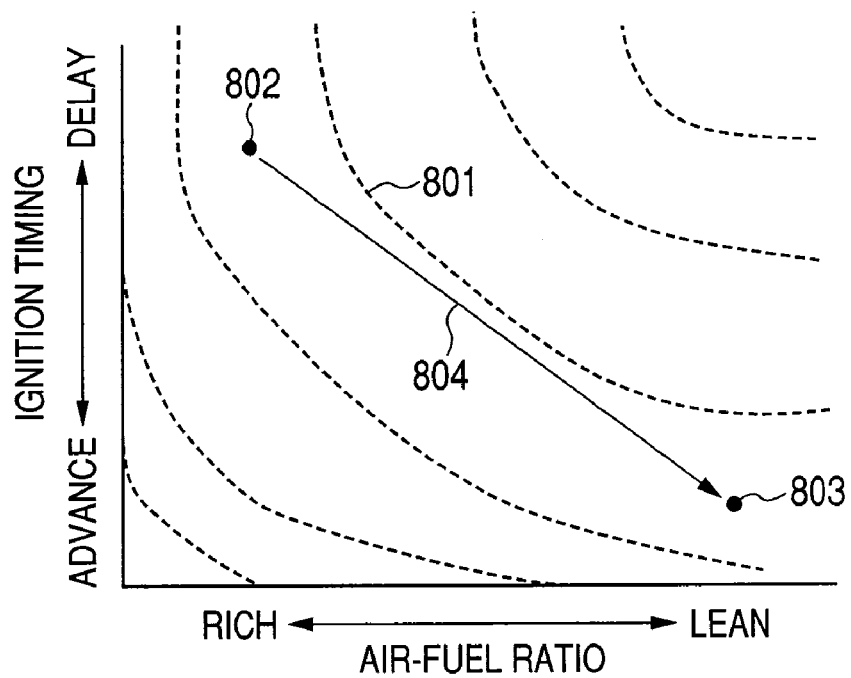
FIG. 8 shows an example of the state transition of the catalyst quick light-off control executed by a fuel control device according to the present invention.

FIG. 8 shows an example of the state transition of the catalyst quick light-off control at the start-up according to the present invention. Line 801 shows an equivalent ISC air volume line. Condition 802 shows the first half of the catalyst quick light-off control at the start-up and also shows the delayed ignition timing and the normal post-start fuel increment coefficient. Condition 803 shows the latter half of the catalyst quick light-off control and also shows the normal ignition timing and the lean post-start fuel increment coefficient. The switching between the first half and the latter half of the catalyst quick light-off control is executed along the transition line 804 of the equivalent ISC air volume line.

Figure 9:
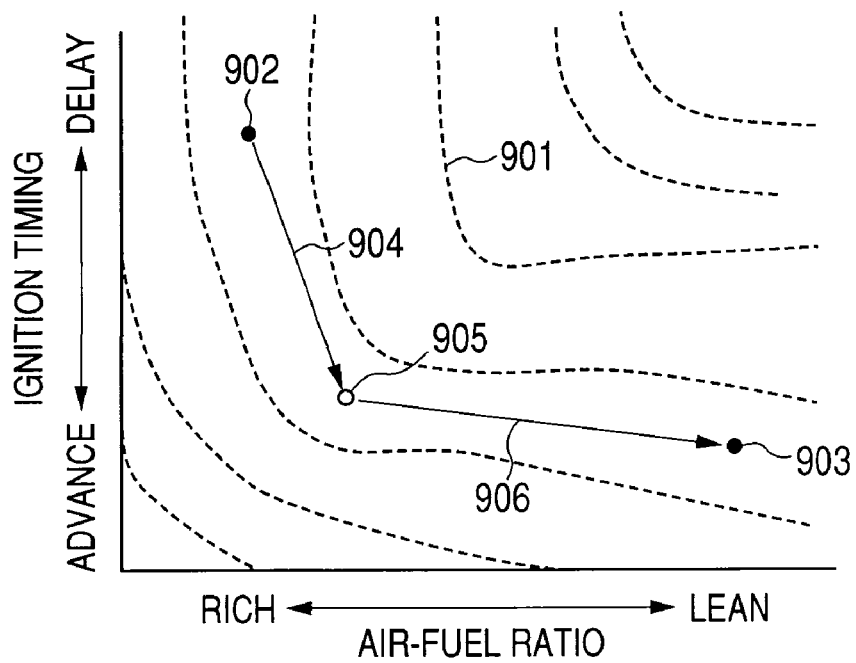
FIG. 9 shows another example of the state transition of the catalyst quick light-off control executed by a fuel control device according to the present invention.

FIG. 9 shows another example of the state transition of the catalyst quick light-off control at the start-up according to the present invention. The difference from the example shown in FIG. 8 is that the equivalent ISC air volume line 901 changes drastically. In this case, when the control state changes from the first half of the catalyst quick light-off control condition 902 to the latter half of the catalyst quick light-off control condition 903, the control state first changes to the intermediate condition 905 along the line 904 and then changes to the condition 903 along the line 906. Moreover, in this embodiment, only one intermediate condition is set, but two or more intermediate conditions can be set depending on the condition of the equivalent ISC air volume line.

Figure 10:
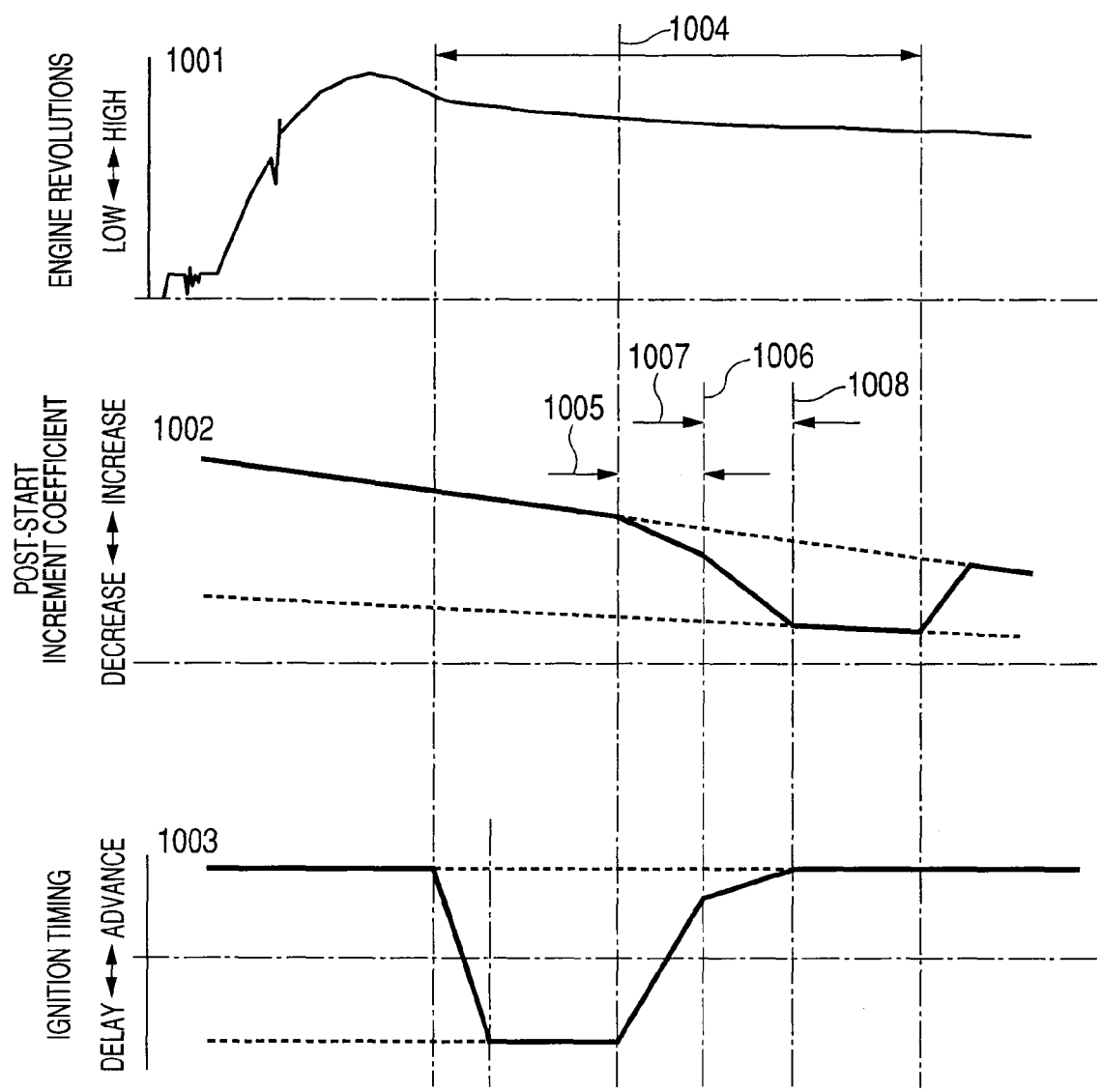
FIG. 10 shows an example of the fuel and the air-fuel ratio set for the fuel control device according to the present invention shown in FIG. 9.

FIG. 10 shows an example of the fuel and the air-fuel ratio set for a fuel control device shown in FIG. 9 according to the present invention. Chart 1001 shows engine revolutions; chart 1002 shows the behavior f the post-start fuel increment coefficient; and chart 1003 shows the behavior of the ignition timing. The catalyst quick light-off control changes from the first half to the latter half at timing 1004. Accordingly, the state changes to the intermediate condition 1006 through a transitional period 1005, and then changers to the latter half of the catalyst quick light-off control through a transitional period 1008.

Figure 11:
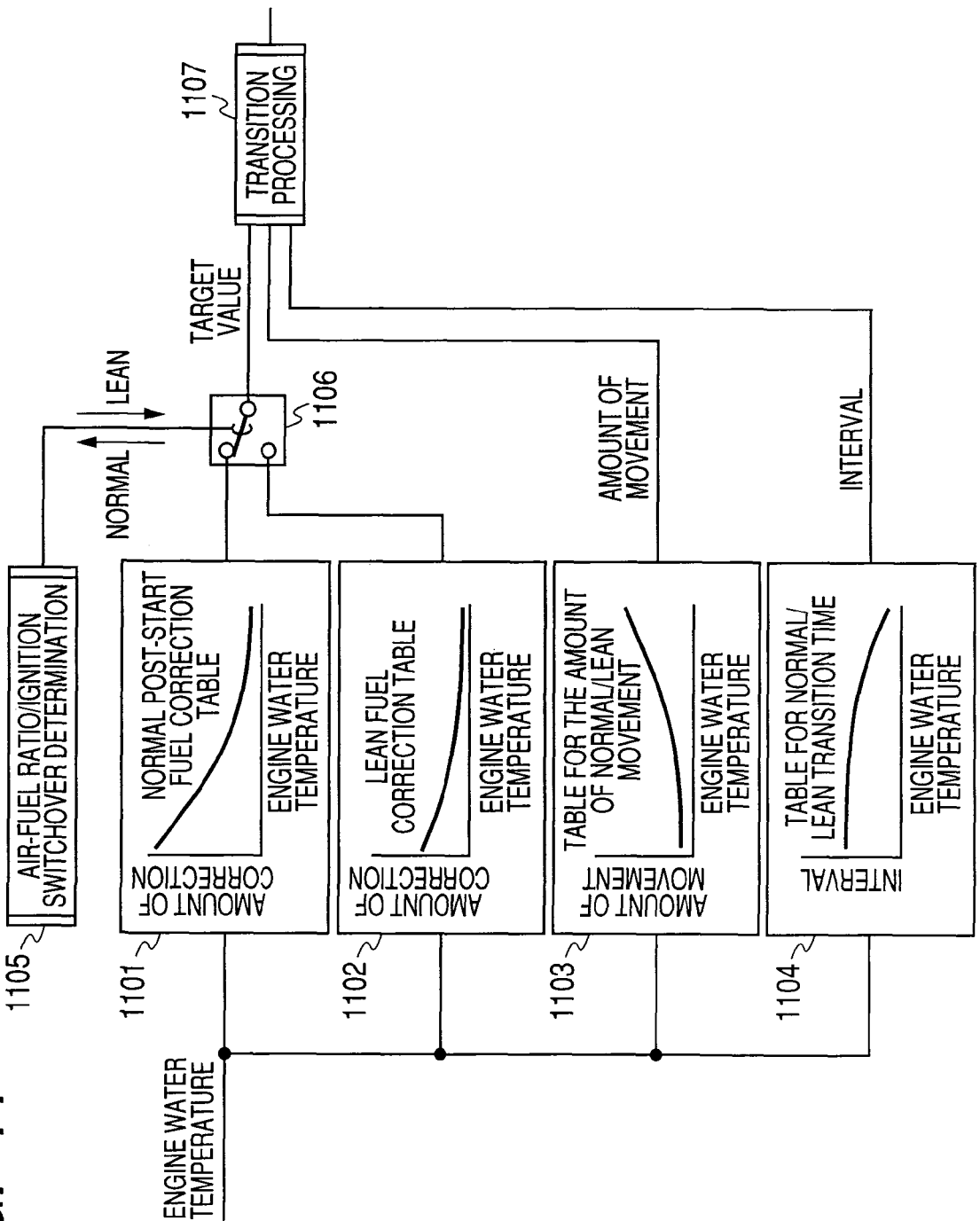
FIG. 11 shows an example of the logic of the air-fuel ratio switchover in the method of catalyst quick light-off control at the start-up executed by a fuel control device according to the present invention.

FIG. 11 shows an example of the logic of the air-fuel ratio switchover in the method of catalyst quick light-off control at the start-up according to the present invention. In block 1101, a table search is executed for the amount of normal post-start fuel correction according to the engine water temperature. In block 1102, a table search is executed for the amount of lean fuel correction according to the engine water temperature. In block 1103, a table search is executed for the amount of movement at the switchover between the normal and lean air-fuel ratio according to the engine water temperature. In block 1104, a table search is executed for the transition interval at the switchover between the normal and lean air-fuel ratio according to the engine water temperature. In block 1105, it is determined whether to switch between the normal and lean air-fuel ratio, and based on the result, the amount of the normal or lean fuel correction is switched by the switch 1106. In block 1107, the transition processing is executed with the amount of correction selected.

Figure 12:
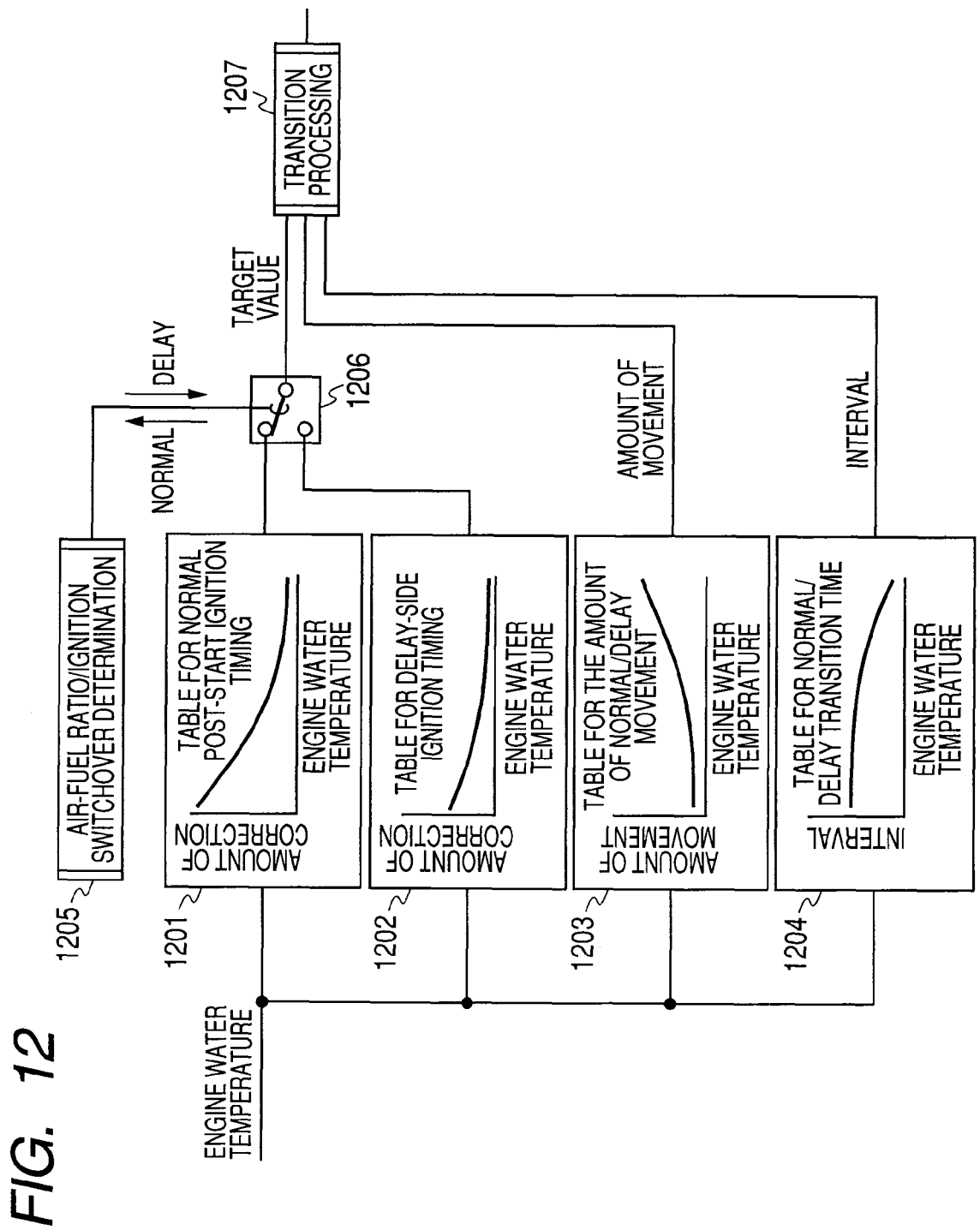
FIG. 12 shows an example of the logic of the ignition timing switchover in the method of catalyst quick light-off control at the start-up executed by a fuel control device according to the present invention.

FIG. 12 shows an example of the logic of the ignition timing switchover in the method of catalyst quick light-off control at the start-up according to the present invention. In block 1201, a table search is executed for the normal post-start ignition timing according to the engine water temperature. In block 1202, a table search is executed for the delay-side ignition timing according to the engine water temperature. In block 1203, a table search is executed for the amount of movement at the switchover between the normal and delayed ignition timing according to the engine water temperature. In block 1204, a table search is executed for the transition interval at the switchover between the normal and delayed ignition timing according to the engine water temperature. In block 1205, it is determined whether to switch between the normal and delayed ignition timing, and based on the result, the normal or delayed ignition timing is switched by a switch 1206. In block 1207, the transition processing is executed with the selected ignition timing.

Figure 13:
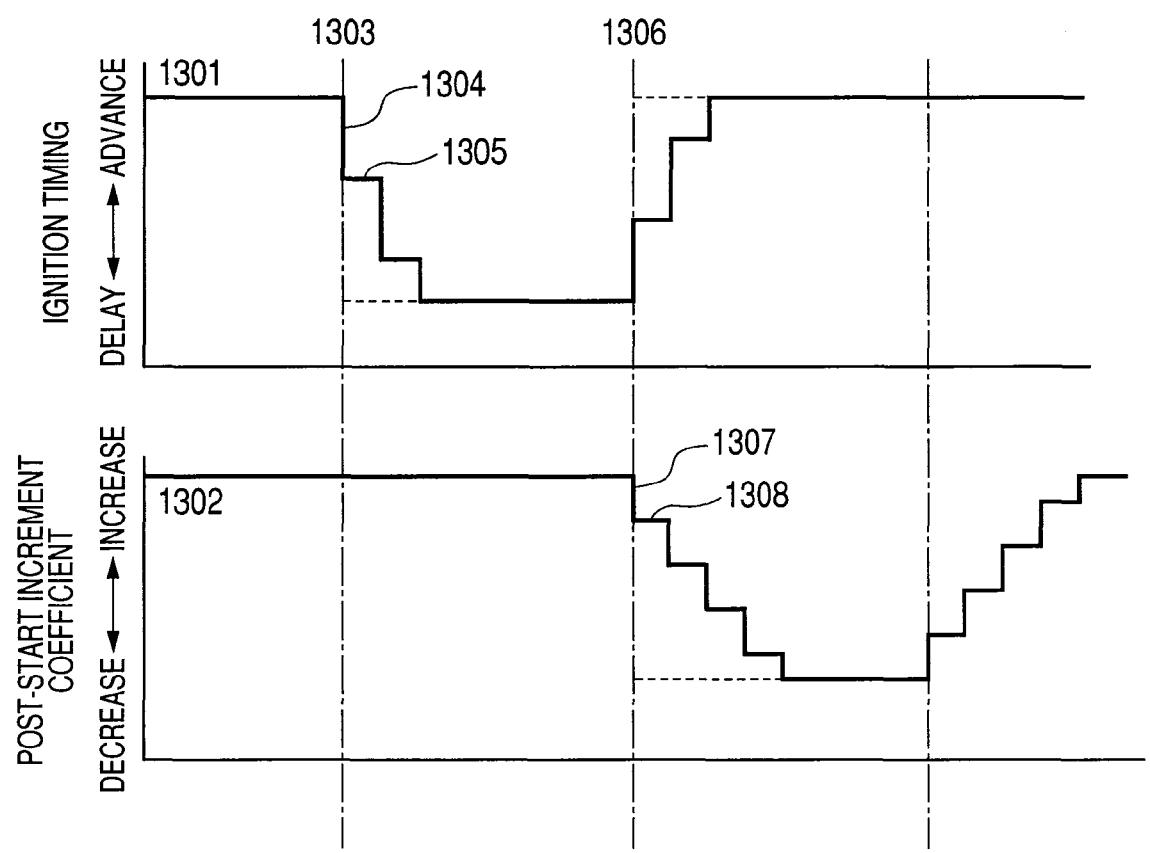
FIG. 13 shows an example of the control transition when the ignition timing and the amount of the air-fuel ratio correction are switched in the catalyst quick light-off method of a fuel control device according to the present invention.

FIG. 13 shows an example of the control transition when the ignition timing and the amount of the air-fuel ratio correction are switched in the method of the catalyst quick light-off at the start-up according to the present invention. Chart 1301 shows the behavior of the ignition timing; and chart 1302 shows the behavior of the post-start increment coefficient. When the catalyst quick light-off control at the start-up starts at timing 1303, the ignition timing gradually changes to the ignition timing for the first half of the catalyst quick light-off control period by an amount of movement 1304 and with the transition interval 1305. When the catalyst quick light-off control enters the latter half of the period at timing 1306, the post-start increment coefficient gradually shifts to the post-start increment coefficient for the latter half of the catalyst quick light-off control period by an amount of movement 1307 and with the transition interval 1308.

Figure 14:
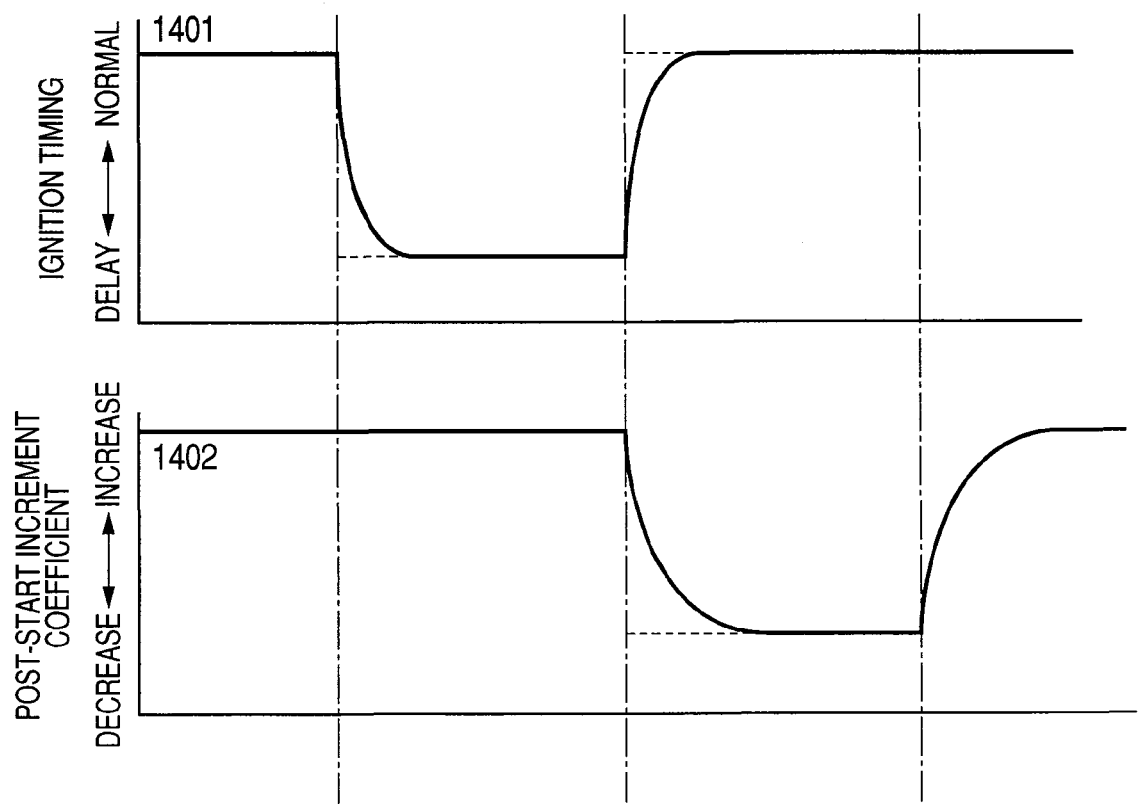
FIG. 14 shows another example of the control transition when the ignition timing and the amount of the air-fuel ratio correction are switched in the catalyst quick light-off method of a fuel control device according to the present invention.

FIG. 14 shows another example of the control transition when the ignition timing and the amount of the air-fuel ratio correction are switched in the method of the catalyst quick light-off at the start-up which is a target of the present invention. Chart 1401 shows the behavior of the ignition timing; and chart 1402 shows the behavior of the post-start increment coefficient. The difference from the example shown in FIG. 13 is that the transition in FIG. 13 is made step-by-step, but the transition in this example is smooth due to the weighted average.

Figure 15:
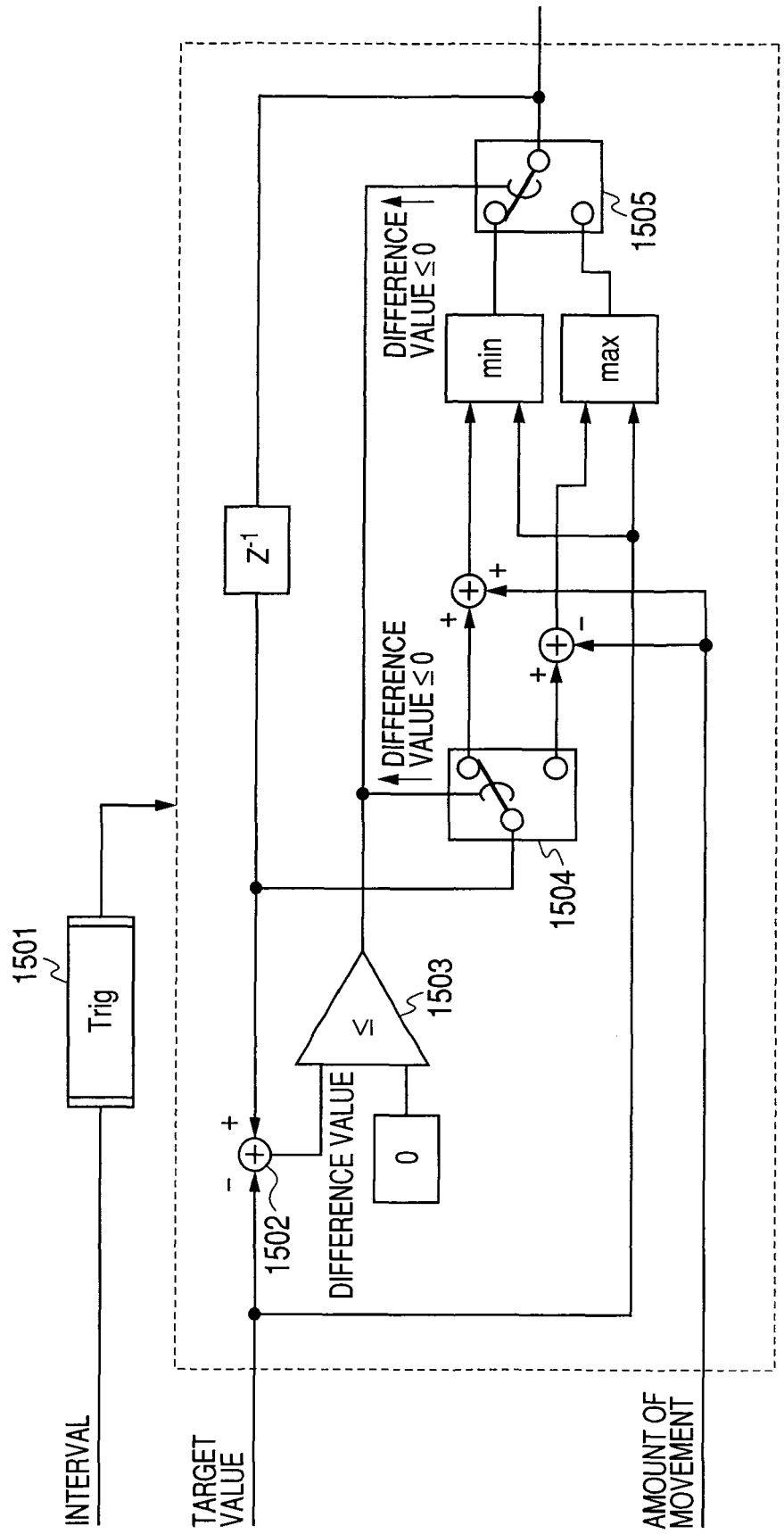
FIG. 15 shows a detailed example of the control block that executes the transition processing shown in FIGS. 11 and 12.

FIG. 15 shows a detailed example of the control block that executes the transition processing shown in FIGS. 11 and 12. This block is activated at every interval provided by the trigger block 1501. The differentiator 1502 calculates the difference between the previous output in this block and a target value. The difference is compared with 0 by a comparator 1503, and when a difference value is 0 or less, the switch 1504 and the switch 1505 are switched, the amount of movement is added to the previous output, and the value is outputted through a path which has a maximum value as a target value. If the difference value is larger than 0, the amount of movement is subtracted from the previous output, and the value is outputted through a path which has a minimum value as a set target value.

Figure 16:
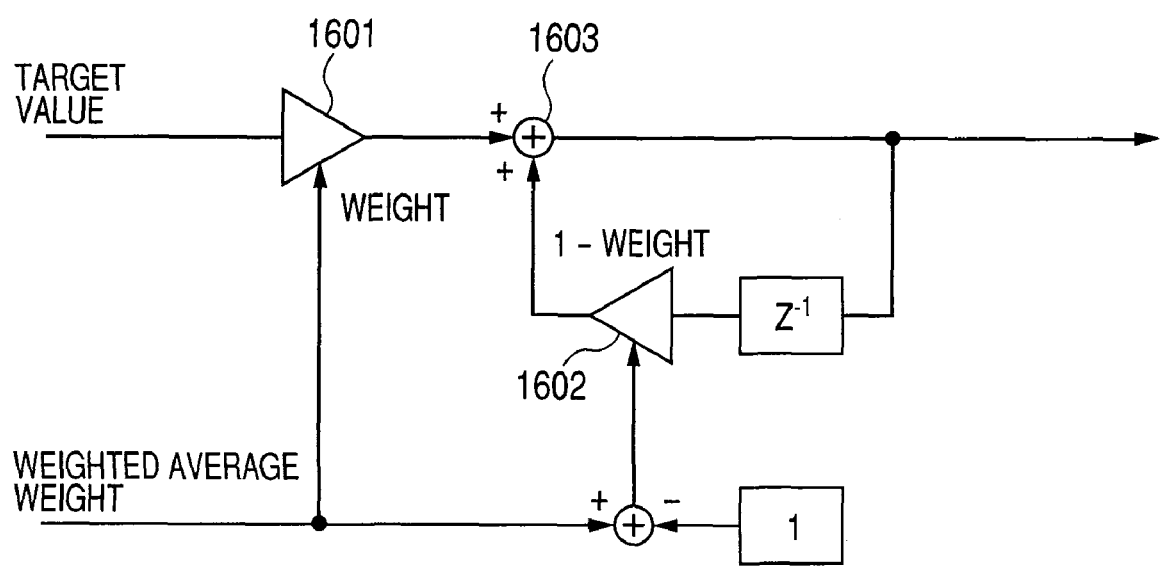
FIG. 16 shows another detailed example of the control block that executes the transition processing shown in FIGS. 11 and 12.

FIG. 16 shows another detailed example of the control block that executes the transition processing shown in FIGS. 11 and 12. This block's output mode is the transition behavior of the example shown in FIG. 14. The target value is multiplied by the weighted average weight by gain 1601. The weighted average weight is less than 1. The previous output value is multiplied by (1−weighted average weight) by a multiplier 1602. Those two multiplied values are added by an adder 1603 and outputted.

Figure 17:
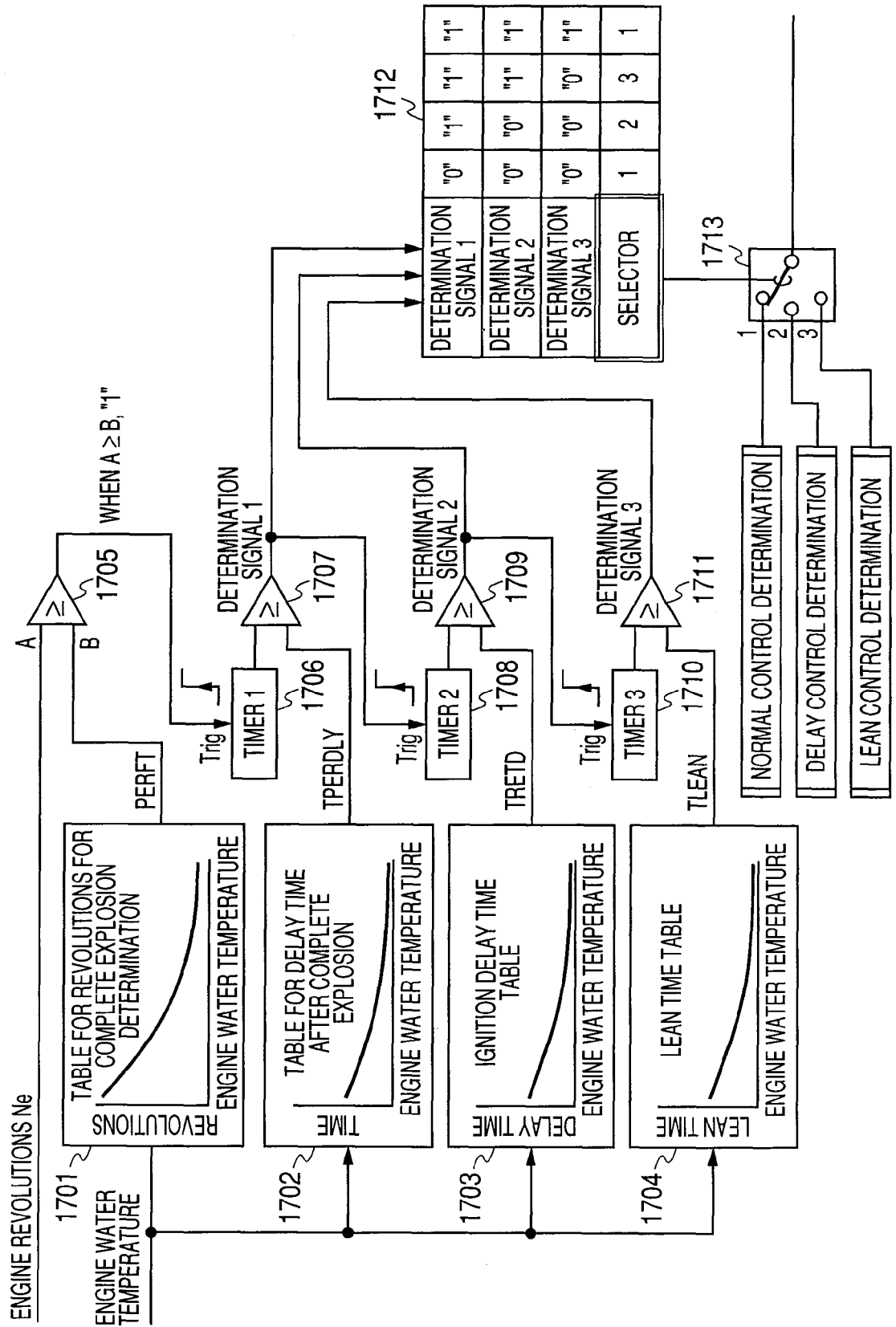
FIG. 17 shows a detailed example of the control block that determines the switchover between the air-fuel ratio and the ignition timing shown in FIGS. 11 and 12.

FIG. 17 shows a detailed example of the control block that determines the switchover between the air-fuel ratio and the ignition timing shown in FIGS. 11 and 12. In block 1701, a table search is executed for the revolutions for complete explosion determination PERFT according to the engine water temperature. In block 1702, a table search is executed for the delay time after complete explosion TPERDLY according to the engine water temperature. In block 1703, a table search is executed for the ignition delay time TRETD according to the engine water temperature. This value becomes the time for the first half of the catalyst quick light-off control period. In block 1704, executes a table search is executed for the lean time TLEAN according to the engine water temperature. This value becomes the time for the latter half of the catalyst quick light-off control period. It is determined by a comparator 1705 whether or not the engine revolutions exceed the revolutions for complete explosion determination PERFT. If the engine revolutions exceeds PERFT, a trigger is provided for timer 1 1706 to activate the timer. It is determined by a comparator 1707 whether or not the value of the timer 1 exceeds the delay time after complete explosion TPERDLY. If the value exceeds the timer value, a trigger is provided for timer 2 1708 to activate the timer, and determination signal 1 is set at "1." It is determined by a comparator 1709 whether or not the value of timer 2 exceeds the ignition delay time TRETD. If the value exceeds TRETD, a trigger is provided for timer 3 1710 to activate the timer, and determination signal 2 is set at "1." It is determined by a comparator 1711 whether or not the value of timer 3 exceeds the lean time TLEAN. If the value exceeds TLEAN, determination signal 3 is set at "1." The selector decision block 1712 chooses the selector according to the combination of the values of the determination signals 1 to 3. Once the selector is chosen, the switch 1713 is switched to select either the normal control, the delay control (first half of the catalyst quick light-off control) or the lean control (latter half of the catalyst quick light-off control), and a command value is outputted.

Figure 18:
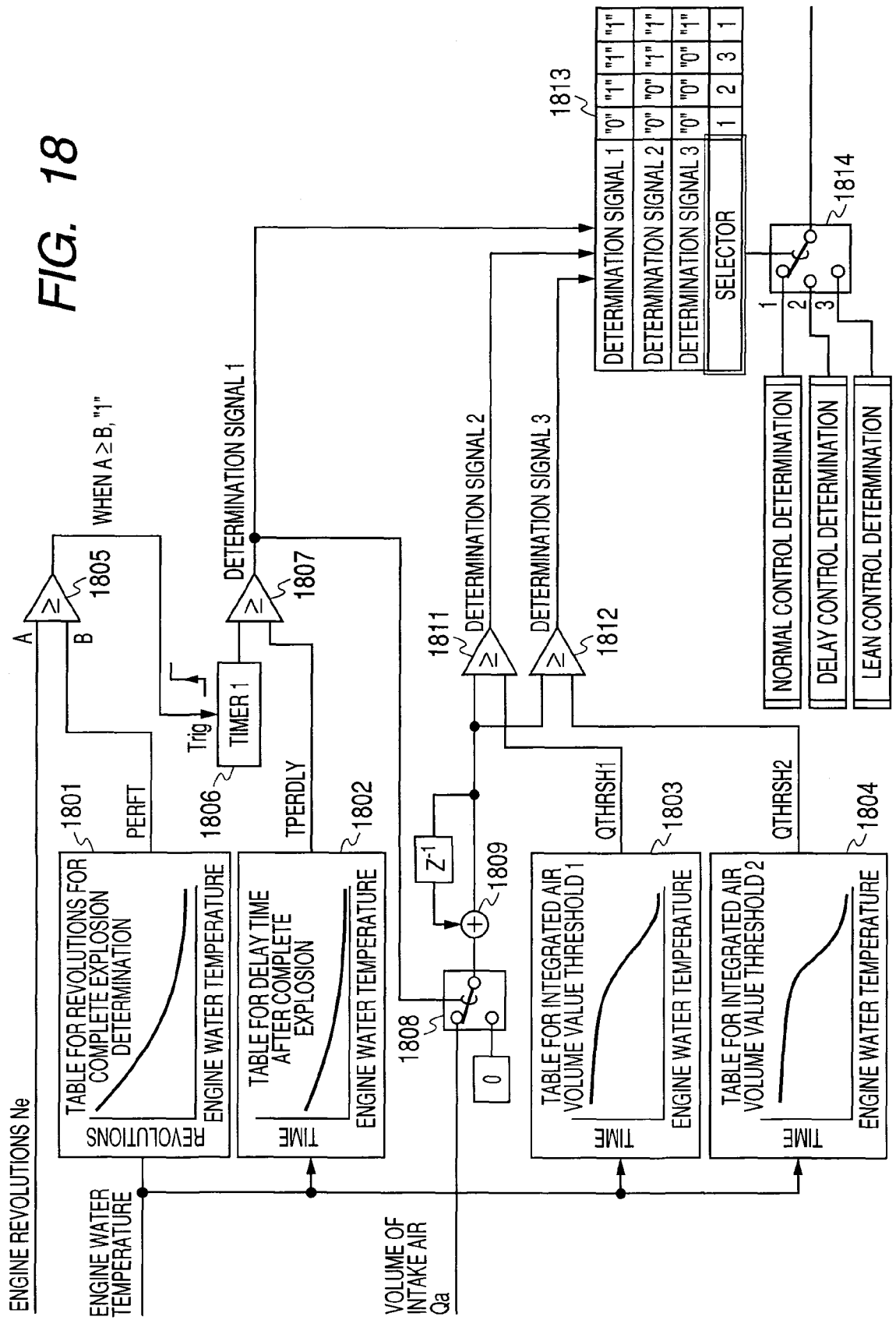
FIG. 18 shows another detailed example of the control block that determines the switchover between the air-fuel ratio and the ignition timing shown in FIGS. 11 and 12.

FIG. 18 shows another detailed example of the control block that determines the switchover between the air-fuel ratio and the ignition timing shown in FIGS. 11 and 12. In block 1801, a table search is executed for the revolutions for complete explosion determination PERFT according to the engine water temperature. In block 1802, a table search is executed for the delay time after complete explosion TPERDLY according to the engine water temperature. In block 1803, a table search is executed for the integrated air volume value threshold 1 QTHRS1 according to the engine water temperature. In block 1804, a table search is executed for the integrated air volume value threshold 2 QTHRSH2 according to the engine water temperature. It is determined by a comparator 1805 whether or not the engine revolutions exceed the revolutions for complete explosion determination PERFT. If the value exceeds PERFT, a trigger is provided for timer 1 1806 to activate the timer. It is determined by a comparator 1807 whether or not the value of timer 1 exceeds the delay time after complete explosion TPERDLY. If the value exceeds TPERDLY, determination signal 1 is set at "1"; and the switch 1808 is switched thereby starting multiplication of intake air volume Qa by an integrator comprising an adder 1809 and a delay device 1810. It is determined by a comparator 1811 whether or not the integrated value of the intake air volume Qa exceeds the integrated air volume value threshold 1 QTHRSH1. If the value exceeds QTHRSH1, determination signal 2 is set at "1." It is determined by a comparator 1812 whether or not the integrated value of the intake air volume Qa exceeds the integrated air volume value threshold 2 QTHRSH2. If the value exceeds QTHRSH2, determination signal 3 is set at "1." The block 1813 chooses the selector according to the combination of the values of the determination signals 1 to 3. Once the selector is decided, the switch 1814 is switched to select either the normal control, the delay control (first half of the catalyst quick light-off control) or the lean control (latter half of the catalyst quick light-off control), and a command value is outputted.

Figure 19:
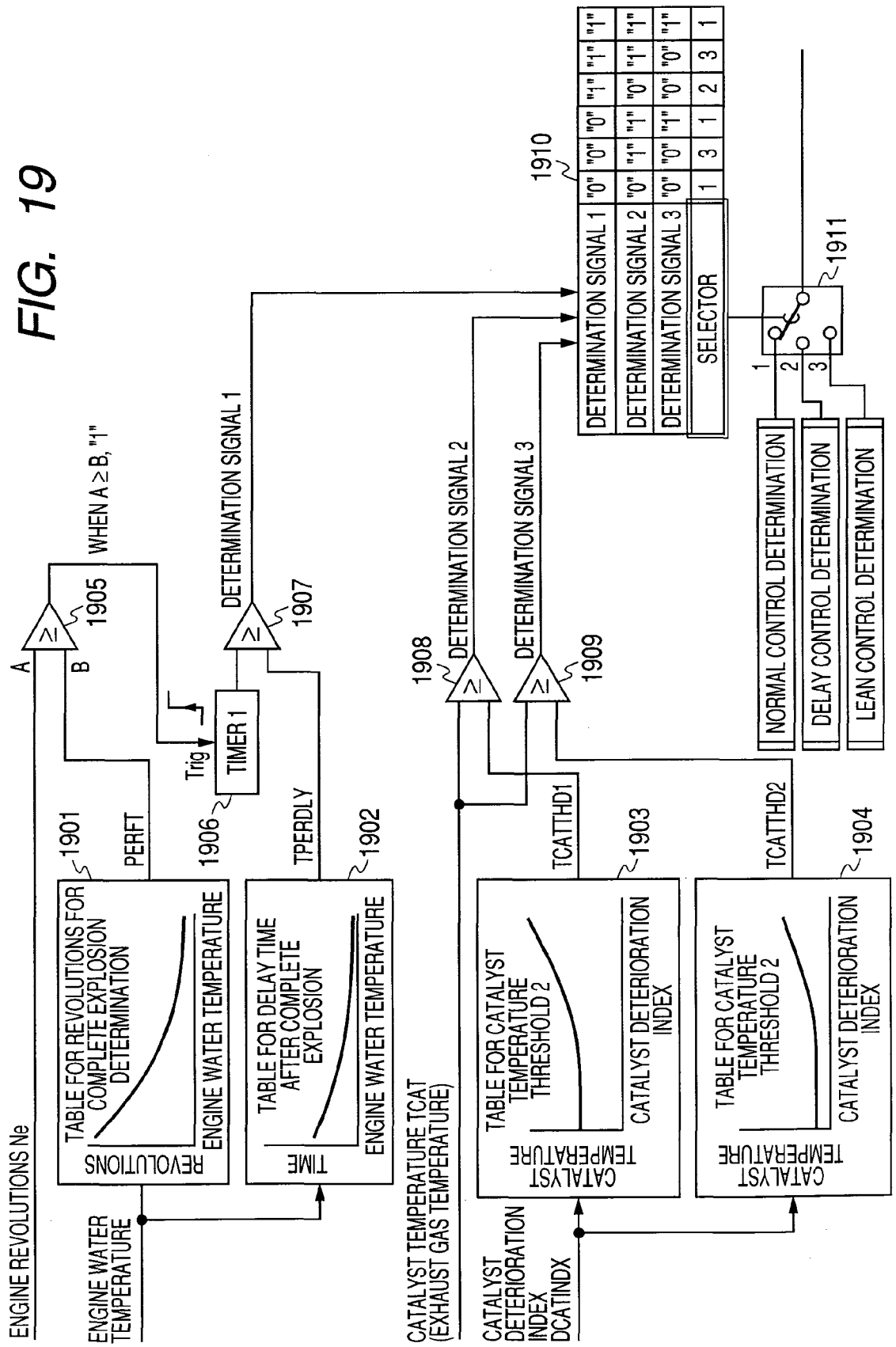
FIG. 19 shows another detailed example of the control block that determines the switchover between the air-fuel ratio and the ignition timing shown in FIGS. 11 and 12.

FIG. 19 shows another detailed example of the control block that determines the switchover between the air-fuel ratio and the ignition timing shown in FIGS. 11 and 12. In block 1901, a table search is executed for the revolutions for complete explosion determination PERFT according to the engine water temperature. In block 1902, a table search is executed for the delay time after complete explosion TPERDLY according to the engine water temperature. In block 1903, a table search is executed for the catalyst temperature threshold 1 TCATTHD1 according to the catalyst deterioration index DCATINDX. In block 1904, a table search is executed for the catalyst temperature threshold 2 TCATTHD2 according to the catalyst deterioration index DCATINDX. It is determined by a comparator 1905 whether or not the engine revolutions exceed the revolutions for complete explosion determination PERFT. If the value exceeds PERFT, a trigger is provided for timer 1 1906 to activate the timer. It is determined by a comparator 1907 whether or not the value of timer 1 exceeds the delay time after complete explosion TPERDLY. If the value exceeds TPERDLY, determination signal 1 is set at "1." It is determined by a comparator 1908 whether or not the catalyst temperature TCAT exceeds the catalyst temperature threshold 1 TCATTHD1. If the value exceeds TCATTHD1, determination signal 2 is set at "1." It is determined by a comparator 1909 whether or not the catalyst temperature TCAT exceeds the catalyst temperature threshold 2 TCATTHD2. If the value exceeds TCATTHD2, determination signal 3 is set at "1." The block 1910 chooses the selector according to the combination of the values of the determination signals 1 to 3. Once the selector is decided, the switch 1911 is switched to select either the normal control, the delay control (first half of the catalyst quick light-off control) or the lean control (latter half of the catalyst quick light-off control), and a command value is outputted.

Figure 20:
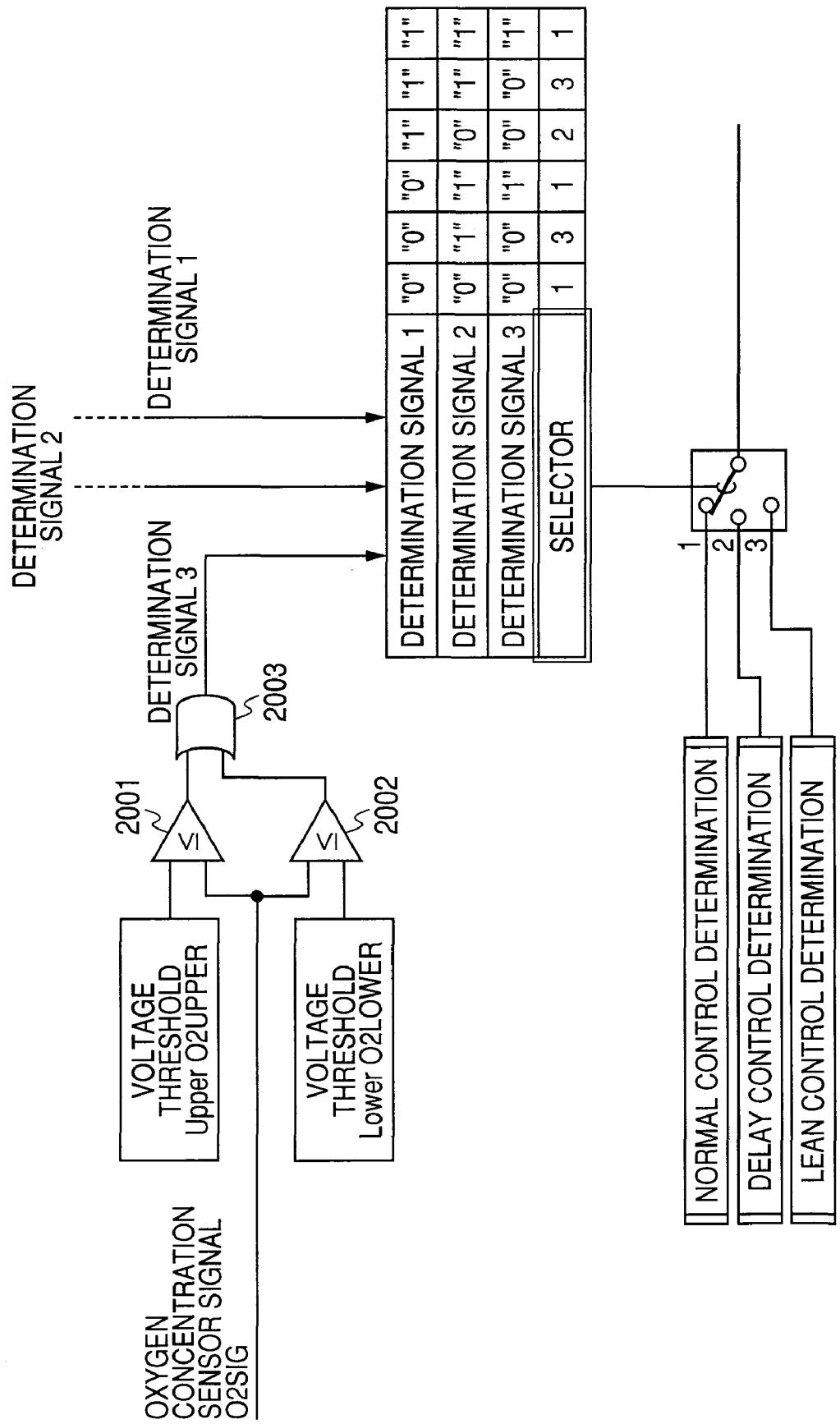
FIG. 20 shows another example of the determination executed by a determination signal 3 shown in FIGS. 17, 18, and 19.

FIG. 20 shows another example of the determination executed by determination signal 3 shown in FIGS. 17, 18, and 19. It is determined by a comparator 2001 and a comparator 2002 whether the oxygen concentration sensor signal O2SIG crossed above the voltage threshold O2UPPER or below the voltage threshold O2LOWER, and when either one was the case, determination signal 3 is set at "1" in the OR circuit 2003. After that, a selector is decided according to the combination with other determination signals thereby selecting the type of control.

Figure 21:
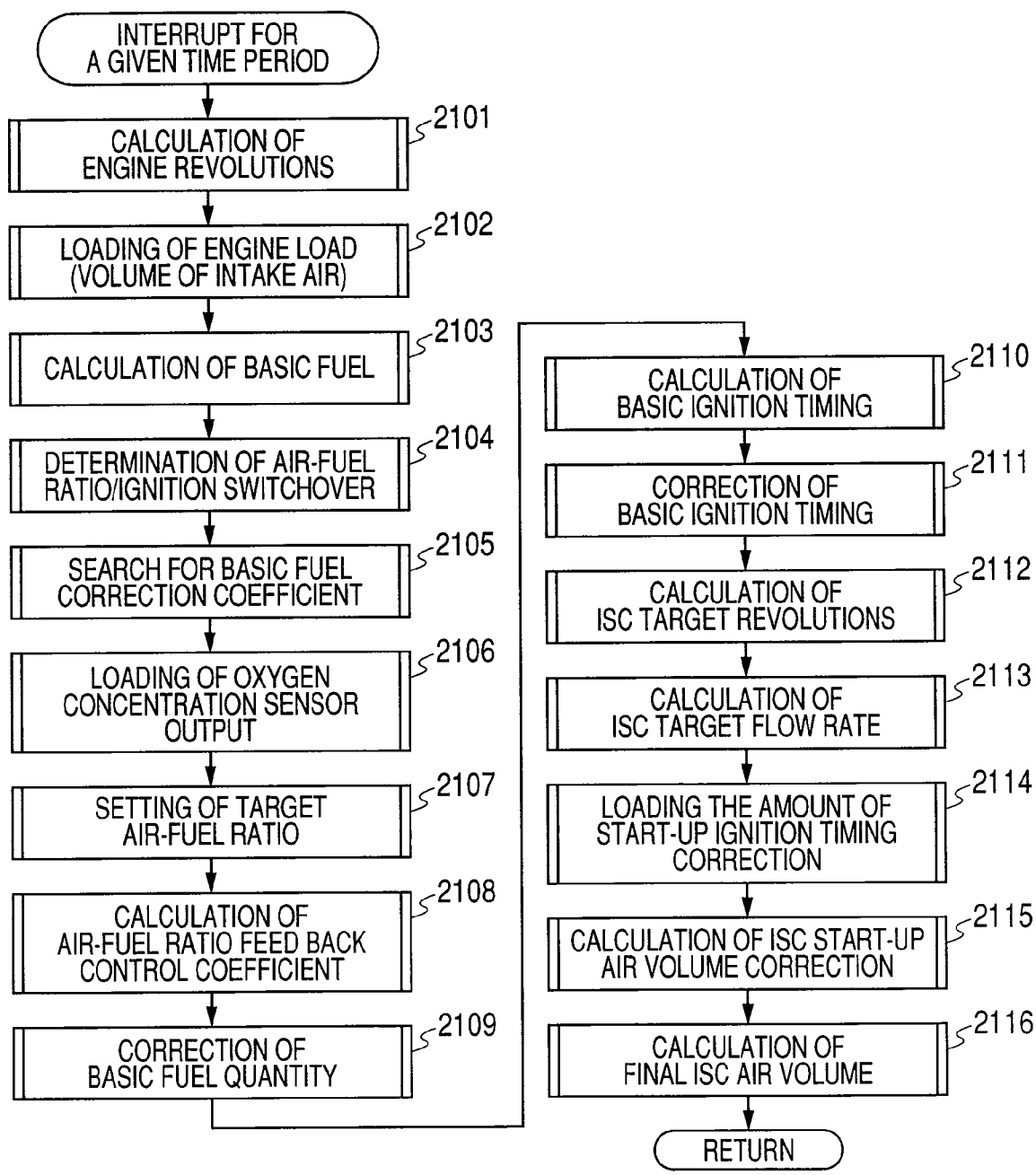
FIG. 21 shows an example of a detailed flow chart of the control executed by a fuel control device with a catalyst quick light-off method according to the present invention.

FIG. 21 shows an example of a detailed flow chart of the control executed by a fuel control device with catalyst quick light-off method according to the present invention. Engine revolutions calculated according to the inputted crank angle sensor signal are loaded in step 2101. In step 2102, an engine load (the volume of intake air) is loaded. In step 2103, basic fuel quantity is calculated according to the engine revolutions and the engine load. In step 2104, switchover between the air-fuel ratio and the ignition timing for the catalyst quick light-off at the start-up is determined. In step 2105, the correction coefficient of the engine's packing efficiency or the like is searched according to the engine revolutions and the engine load. The output signal from the oxygen concentration sensor is loaded in step 2106, and in step 2107, the target air-fuel ratio requested by the engine is searched according to the engine revolutions and the engine load. In step 2108, based on the output signal from the oxygen concentration sensor and the target air-fuel ratio, the air-fuel ratio feed back control coefficient is calculated. In step 2109, based on the correction coefficient of the packing efficiency or the like, the air-fuel ratio feed back control coefficient, and the air-fuel ratio switchover determination made in step 2205, the basic fuel quantity is corrected. In step 2110, the basic ignition timing is searched based on the engine revolutions and the engine load. In step 2111, based on the air-fuel ratio/ignition switchover determination made in step 2104, the basic ignition timing is corrected. In step 2112, based on the engine water temperature, target idle-revolutions is calculated. In step 2113, the ISC target flow rate necessary for maintaining the target idle-revolutions is calculated. In step 2114, the amount of correction of the basic ignition timing obtained in step 2111 is loaded. In step 2115, based on the amount of correction of the basic ignition timing, the amount of corrected air volume at the ISC start-up is calculated. In step 2116, based on the amount of corrected air volume at the ISC start-up, the final volume of ISC air is calculated, and the command value is outputted to the ISC valve.

Figure 22:
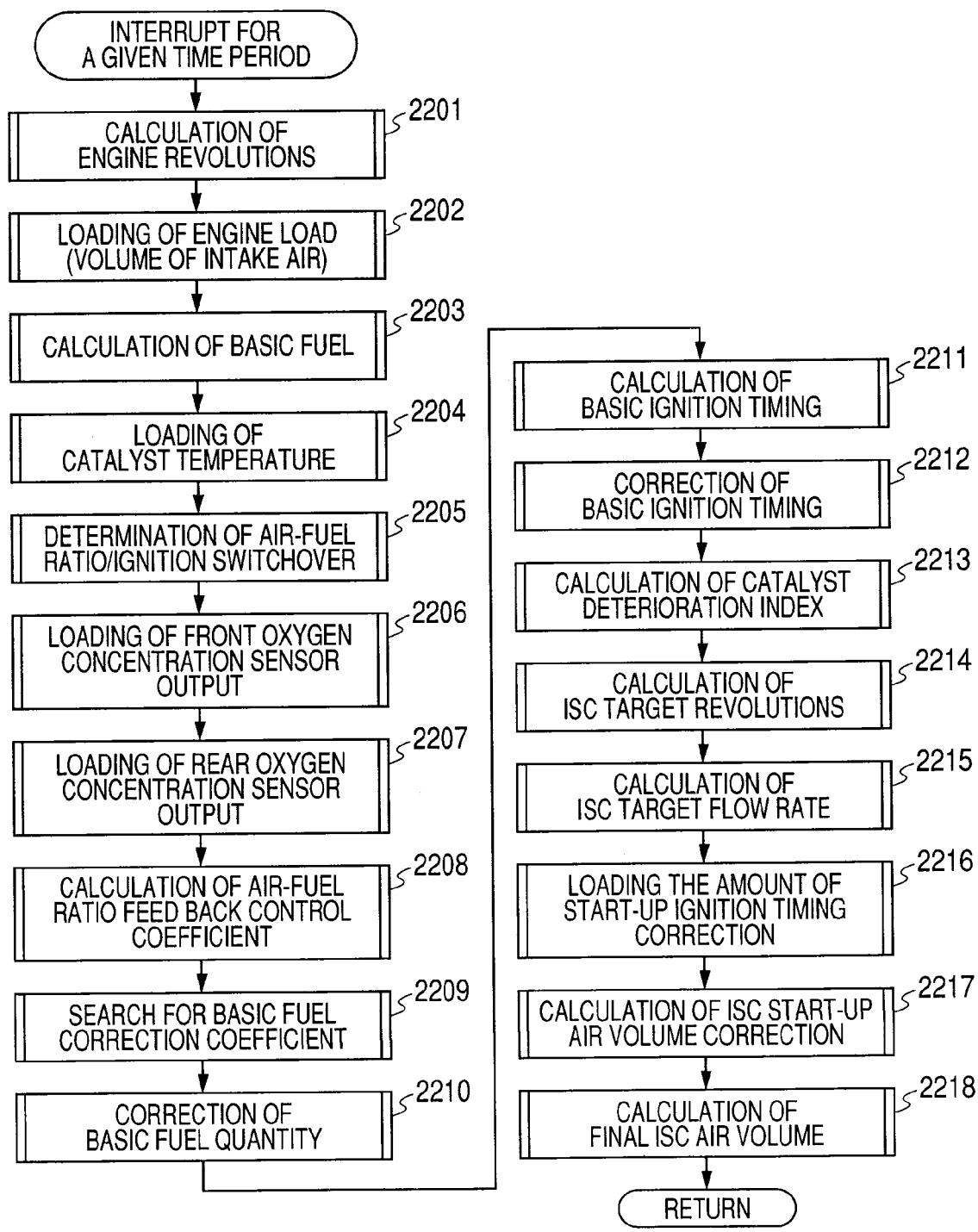
FIG. 22 shows another example of a detailed flow chart of the control executed by a fuel control device with a catalyst quick light-off method according to the present invention.

FIG. 22 shows another example of a detailed flow chart of the control executed by a fuel control device with catalyst quick light-off method according to the present invention. Engine revolutions calculated according to the crank angle sensor signal inputted in step 2201 are loaded. In step 2202, an engine load (the volume of intake air) is loaded. In step 2203, based on the engine revolutions and the engine load, the basic fuel quantity is calculated. In step 2204, the catalyst temperature is loaded according to the output signal of the catalyst temperature sensor. In step 2205, switchover between the start-up air-fuel ratio and the ignition timing for the catalyst quick light-off at the start-up is determined. In step 2206, the output from the oxygen concentration sensor disposed at the front of the catalyst (front catalyst) is loaded. In step 2207, an output from the oxygen concentration sensor disposed at the rear of the catalyst (front catalyst) is loaded. In step 2208, the air-fuel ratio feed back control coefficient is calculated according to the output signals from the oxygen concentration sensors disposed at the front and rear of the catalyst. In step 2209, the correction coefficient of the engine's packing efficiency or the like is searched according to the engine revolutions and the engine load. In step 2210, the basic fuel quantity is corrected based on the correction coefficient of the engine's packing efficiency or the like, the air-fuel ratio feed back control coefficient, and the air-fuel ratio switchover determination executed in step 2205. In step 2211, the basic ignition timing is searched according to the engine revolutions and the engine load. In step 2212, the basic ignition timing is corrected based on the air-fuel ratio/ignition switchover determination executed in the step 2205. In step 2213, the catalyst's deterioration index is calculated based on the outputs from the oxygen concentration sensors disposed at the front and rear of the catalyst. In step 2214, target idle-revolutions is calculated based on the engine water temperature. In step 2215, the ISC target flow rate is calculated which is necessary to maintain the target idle-revolutions. In step 2216, the amount of correction of the basic ignition timing obtained in step 2211 is loaded. In step 2217, the amount of corrected air volume at the ISC start-up is calculated based on the amount of correction of the basic ignition timing. In step 2218, based on the amount of corrected air volume at the ISC start-up, the final volume of ISC air is calculated, and the command value is outputted to the ISC valve.

Figure 23:
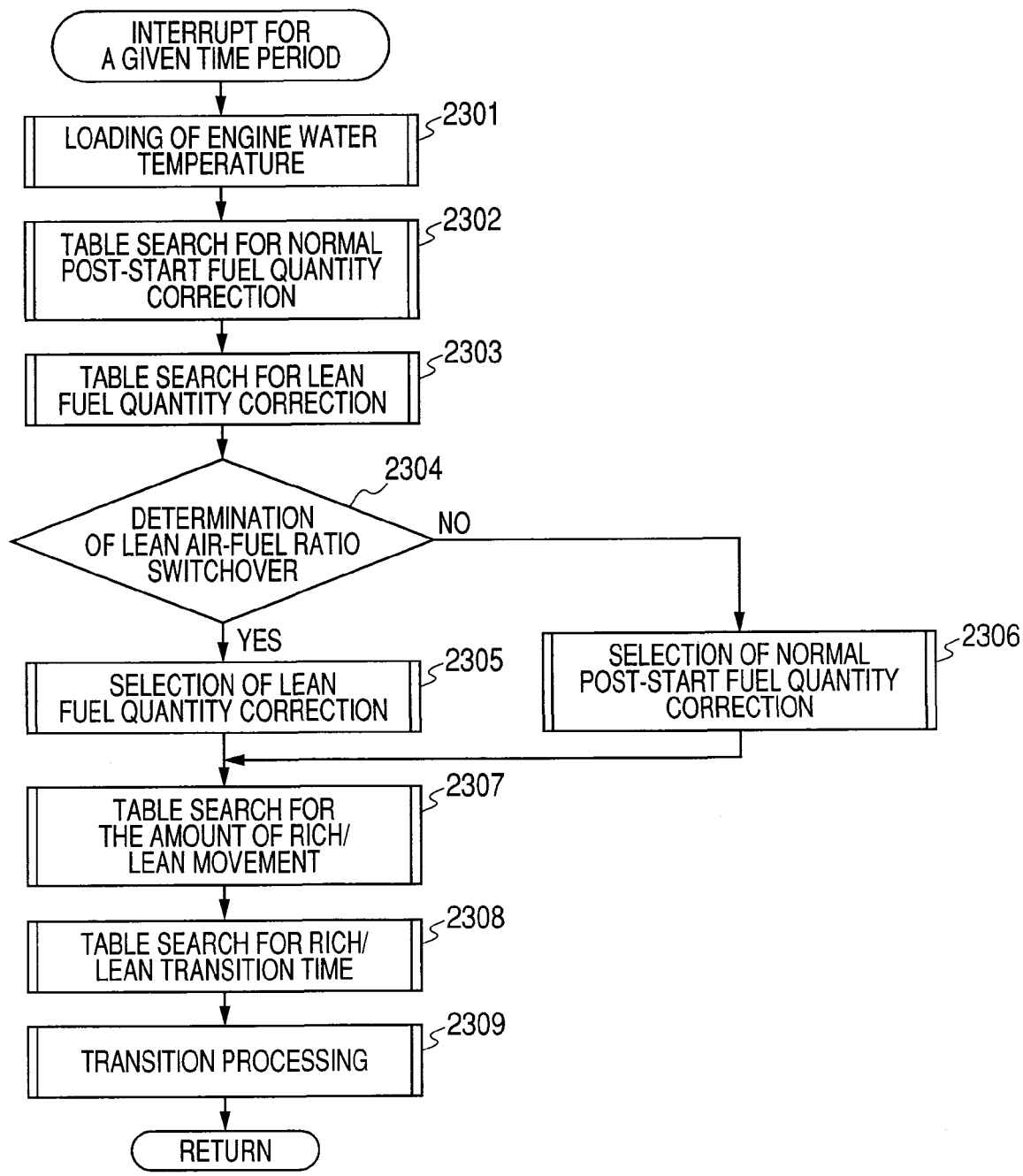
FIG. 23 shows an example of a detailed flow chart of the logic of the air-fuel ratio switchover in the method of catalyst quick light-off control at the start-up executed by a fuel control device according to the present invention.

FIG. 23 shows an example of a detailed flow chart of the logic of the air-fuel ratio switchover in the method of the catalyst quick light-off control at the start-up according to the present invention. In step 2301, the engine water temperature is loaded. In step 2302, a table search for the normal post-start fuel correction coefficient is executed according to the engine water temperature. In step 2303, a table search for the lean fuel correction coefficient is executed according to the engine water temperature. In step 2304, it is determined whether or not the air-fuel ratio is switched to the lean fuel ratio. If the lean fuel ratio is determined, the lean fuel correction coefficient is selected in step 2305; and if it is not the case, the normal post-start correction coefficient is selected in step 2306. In step 2307, a table search for the amount of normal/lean movement is executed according to the engine water temperature. In step 2308, a table search for the normal/lean transition time is executed according to the engine water temperature. In step 2309, the transition processing is executed by using the selected fuel correction coefficient, the amount of movement, and the transition time.

Figure 24:
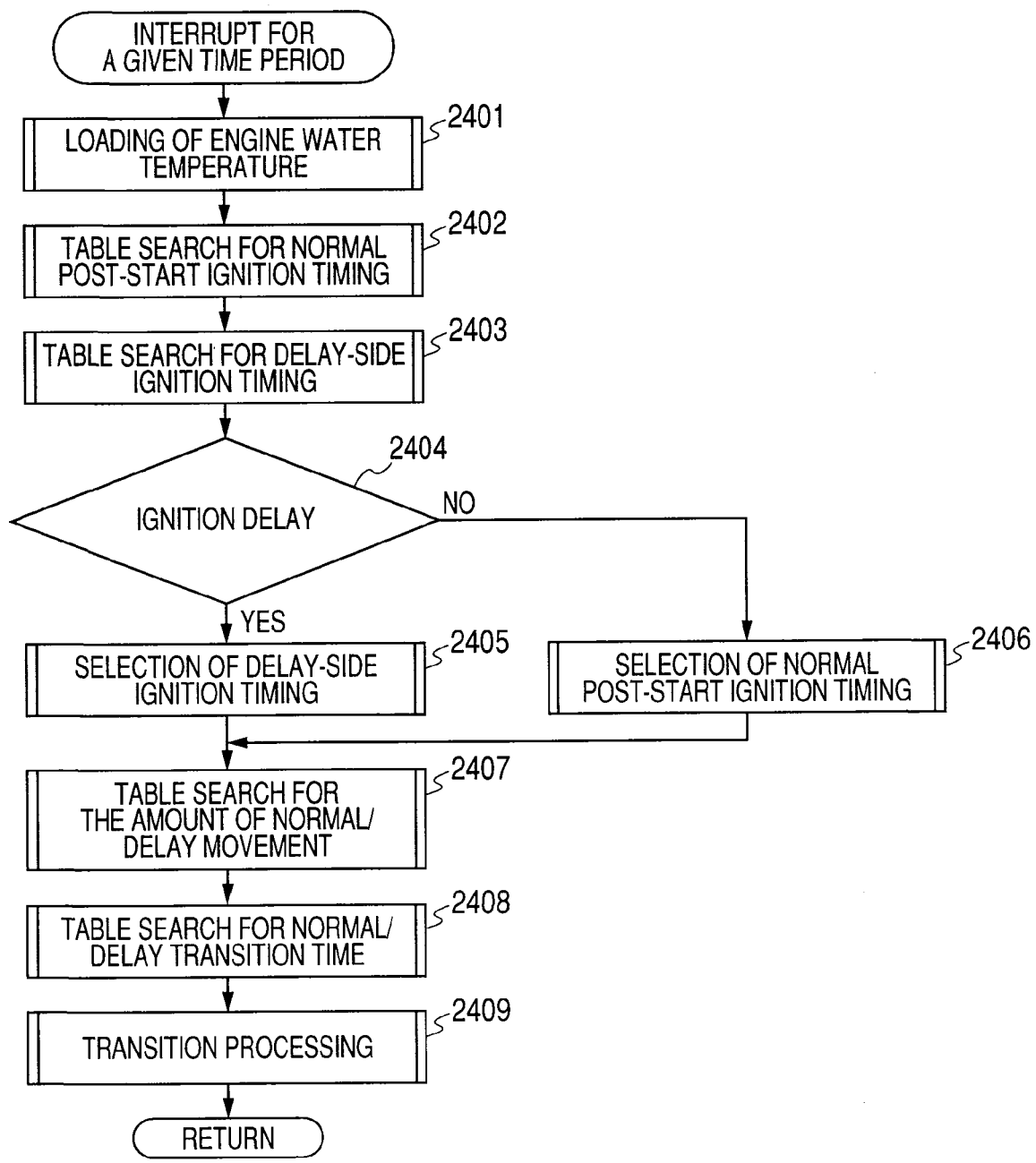
FIG. 24 shows an example of a detailed flow chart of the logic of the ignition timing switchover in the method of catalyst quick light-off control at the start-up executed by a fuel control device according to the present invention.

FIG. 24 shows an example of a detailed flow chart of the logic of the ignition timing switchover in the method of the catalyst quick light-off control at the start-up according to the present invention. In step 2401, the engine water temperature is loaded. In step 2402, a table search for the normal post-start ignition timing is executed according to the engine water temperature. In step 2403, a table search for the delay-side ignition timing is executed according to the engine water temperature. In step 2404, it is determined whether or not the ignition timing is switched to the delay timing. If the delay timing is determined, the delay-side ignition timing is selected in step 2405; and if it is not the case, the normal post-start ignition timing is selected in step 2406. In step 2407, a table search for the amount of normal/delay movement is executed according to the engine water temperature. In step 2408, a table search for the normal/R delay transition time is executed according to the engine water temperature. In step 2409, the transition processing is executed by using the selected ignition timing, the amount of movement, and the transition time.

Figure 25:
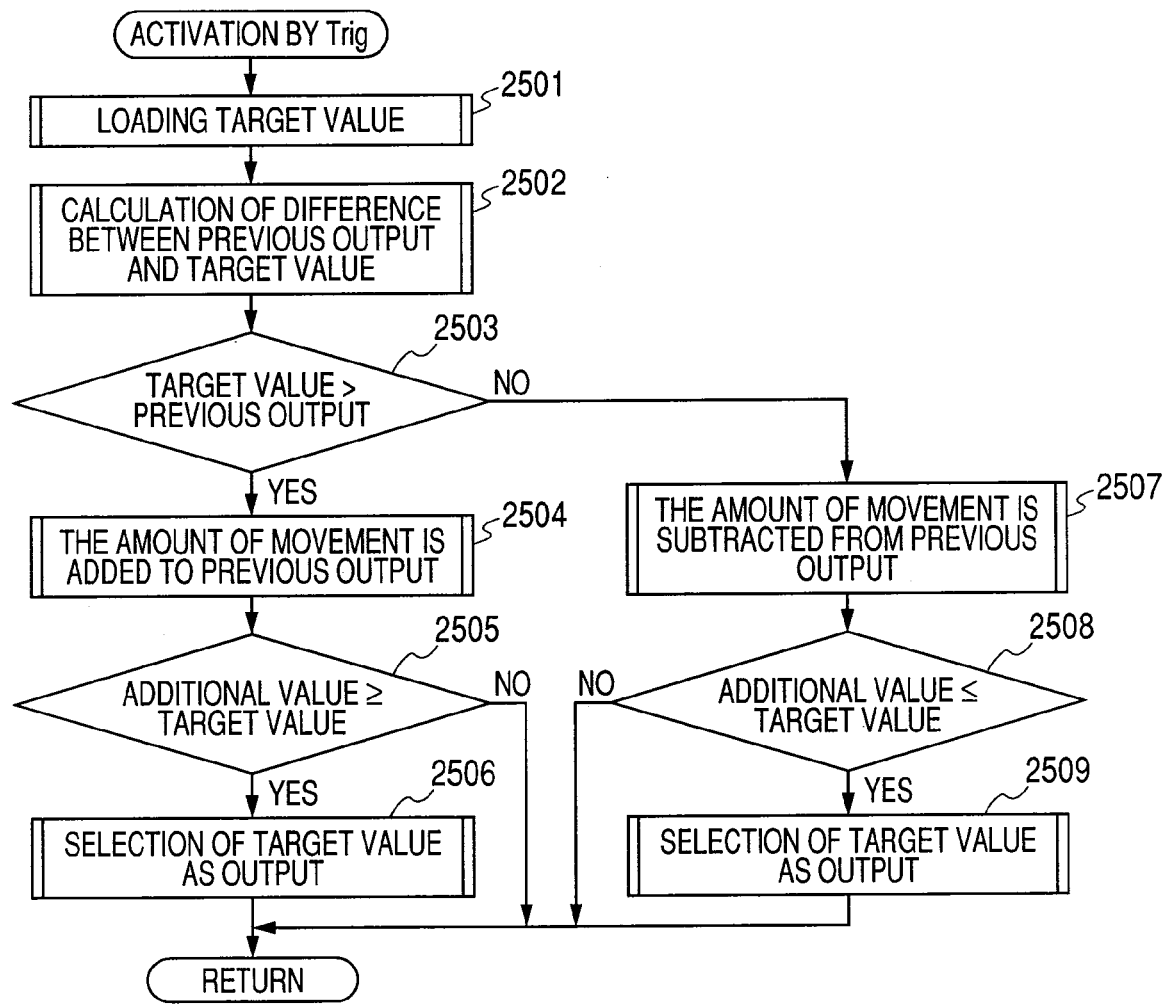
FIG. 25 shows an example of a detailed flow chart of the transition processing shown in FIG. 15.

FIG. 25 shows an example of a detailed flow chart of the transition processing shown in FIG. 15. This chart is activated with predetermined intervals by a trigger provided at every transition time. The target value entered in step 2501 is loaded. In step 2502, the target value is compared with the previous output. In step 2503, based on the compared value, it is determined whether or not the target value is greater than the previous output. If the target value is greater, the amount of movement is added to the previous output in step 2504, and then in step 2505, it is determined whether or not the additional value is greater than the target value, and if the additional value is greater, the target value is selected as an output value in step 2506. If it is determined that the target value is less than the previous output in step 2503, the amount of movement is subtracted from the previous output in step 2507. In step 2508, the subtracted value is compared with the target value, and when the target value is greater, the target value is selected as an output in step 2509.

Figure 26:
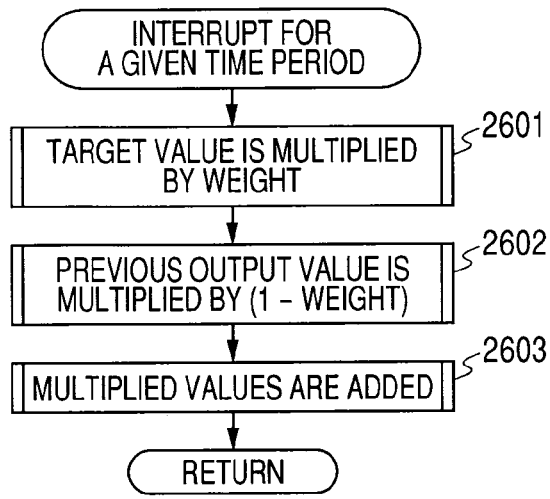
FIG. 26 shows an example of a detailed flow chart of the transition processing shown in FIG. 16.

FIG. 26 shows an example of a detailed flow chart of the transition processing shown in FIG. 16. In step 2601, the target value is multiplied by a weight. In step 2602, the previous output value is multiplied by (1−weight). In step 2603, the two multiplied values are added and outputted.

Figure 27:
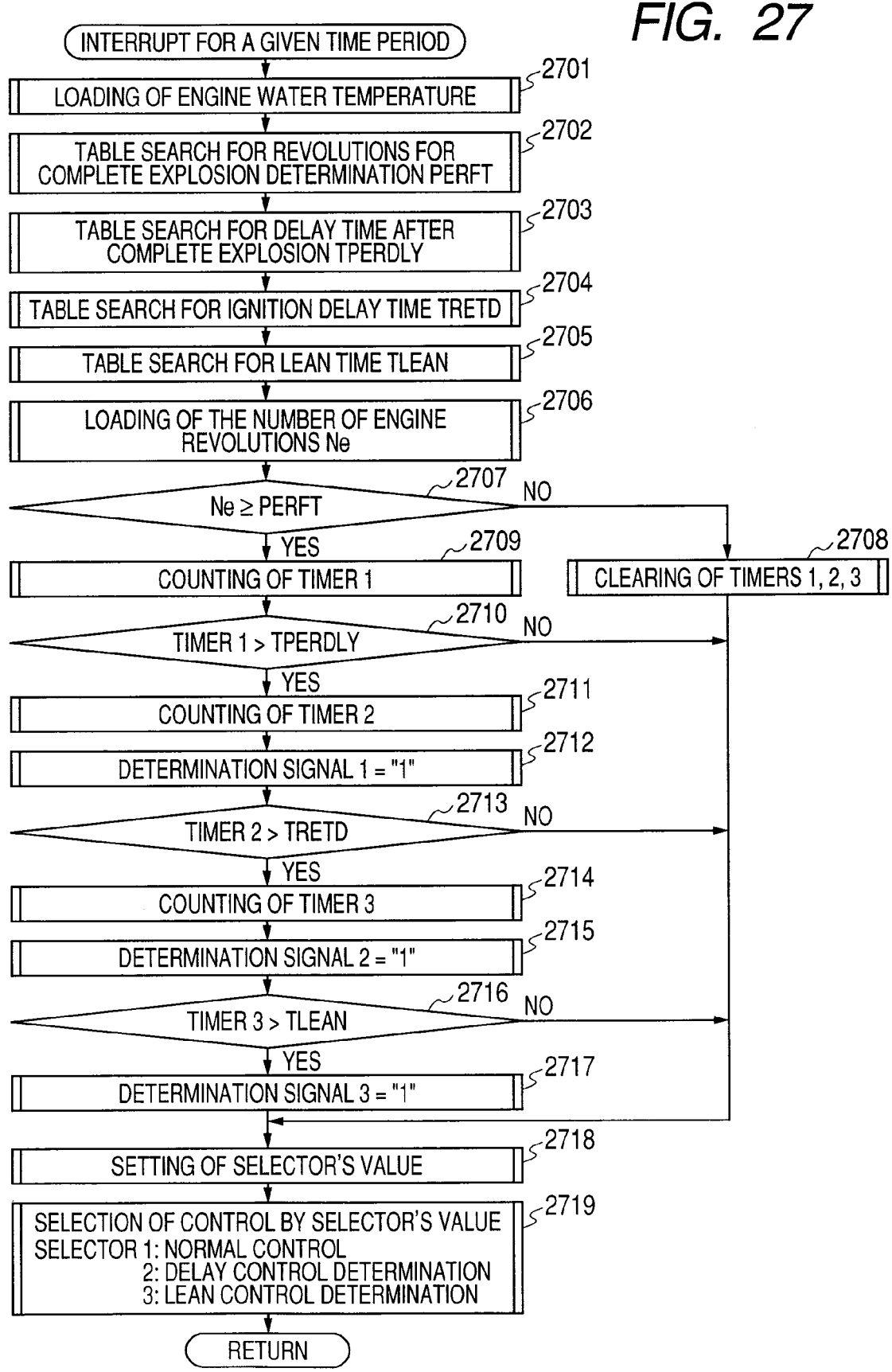
FIG. 27 shows an example of a detailed flow chart of the determination of the air-fuel ratio/ignition switchover shown in FIG. 17.

FIG. 27 shows an example of a detailed flow chart of the determination of the air-fuel ratio/ignition switchover shown in FIG. 17. In step 2701, the engine water temperature is loaded. In step 2702, a table search for the revolutions for complete explosion determination PERFT is executed according to the engine water temperature. In step 2703, a table search for the delay time after complete explosion TPERDLY is executed according to the engine water temperature. In step 2704, a table search for the ignition delay time TRETD is executed. In step 2705, a table search for the lean time TLEAN is executed according to the engine water temperature. In step 2706, the engine revolutions Ne is loaded. In step 2707, it is determined whether or not the engine revolutions Ne is greater than the revolutions for complete explosion determination PERFT. If Ne is not greater, timers 1 to 3 are initialized in step 2708. If Ne is greater than PERFT, timer 1 is counted up in step 2709, and in step 2710, it is determined whether or not the value of timer 1 is greater than the delay time after complete explosion TPERDLY. If the timer value is greater than TPERDLY, timer 2 is counted up in step 2711, and in step 2712, determination signal 1 is set at "1." In step 2713, it is determined whether or not the value of timer 2 is greater than the ignition delay time TRETD. If the timer value is greater than TRETD, timer 3 is counted up in step 2714, and in step 2715, determination signal 2 is set as "1." In step 2716, it is determined whether or not the value of timer 3 is greater than the lean time TLEAN. If the timer value is greater than TLEAN, in step 2717, determination signal 3 is set at "1." After that, in step 2718, a selector is specified based on the determination signals 1 to 3, and the control which corresponds to the selector is selected in step 2719.

Figure 28:
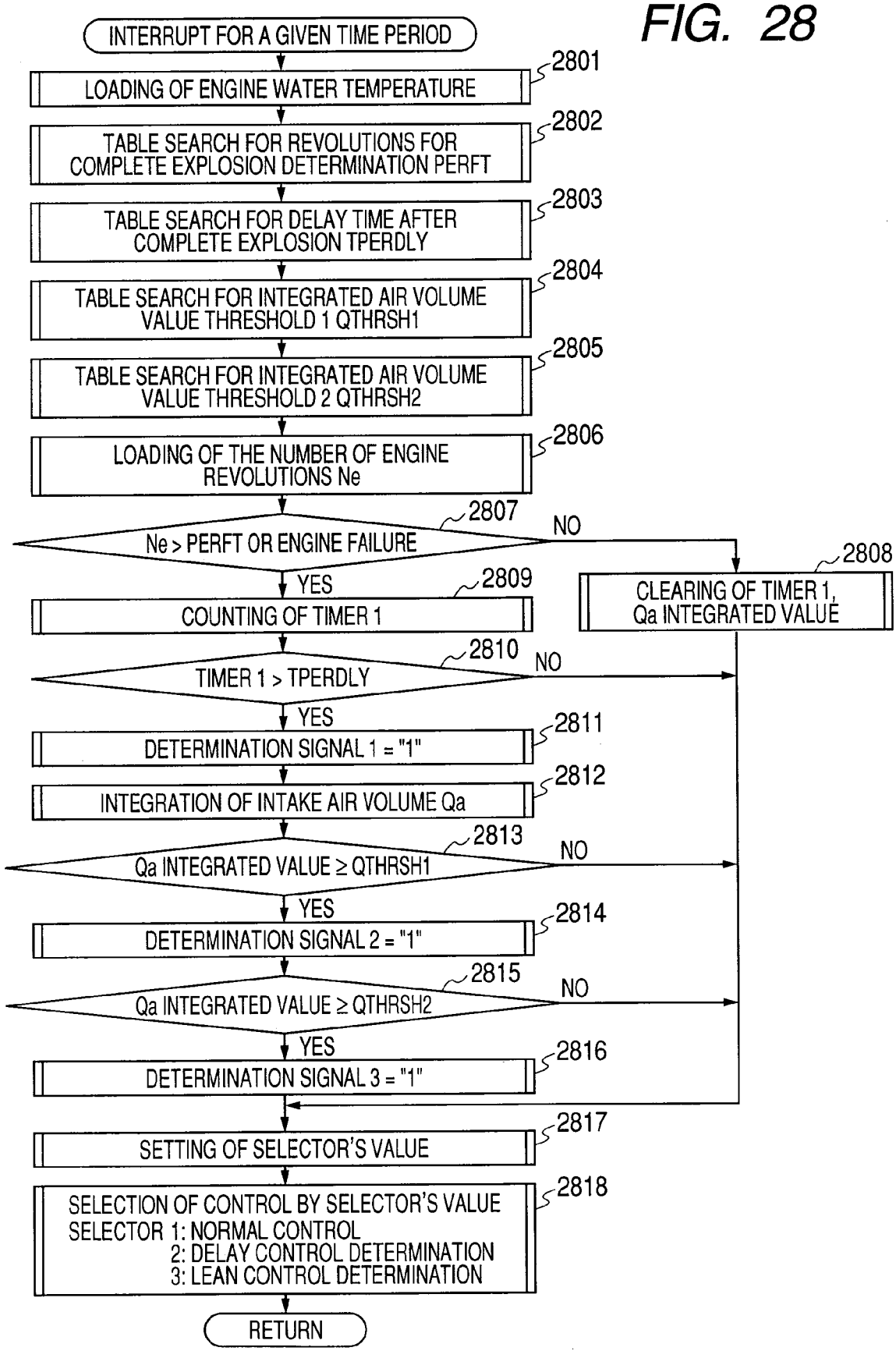
FIG. 28 shows a detailed example of a control block that executes the determination of the air-fuel ratio/ignition switchover shown in FIG. 18.

FIG. 28 shows a detailed example of a control block that executes the determination of the air-fuel ratio/ignition switchover shown in FIG. 18. In step 2801, the engine water temperature is loaded. In step 2802, a table search for the revolutions for complete explosion determination PERFT is executed according to the engine water temperature. In step 2803, a table search for the delay time after complete explosion TPERDLY is executed according to the engine water temperature. In step 2804, a table search for the integrated air volume value threshold 1 QTHRSH1 is executed according to the engine water temperature. In step 2805, a table search for the integrated air volume value threshold 2 QTHRSH2 is executed according to the engine water temperature. In step 2806, the engine revolutions Ne is loaded. In step 2807, it is determined whether or not the engine revolutions Ne is greater than the revolutions for complete explosion determination PERFT. If Ne is not greater, timer 1 is initialized in step 2808, and the integrated air volume value is cleared. If Ne is greater than PERFT, timer 1 is counted up in step 2809, and in step 2810, it is determined whether or not the value of timer 1 is greater than the delay time after complete explosion TPERDLY. If the timer value is greater than TPERDLY, in step 2811, determination signal 1 is set at "1," and in step 2812, intake air volume Qa starts to be multiplied. In step 2813, it is determined whether or not the integrated value Qa is greater than the integrated air volume value threshold 1 QTHRSH1. If the value is greater than QTHRSH1, in step 2814, determination signal 2 is set at "1." In step 2815, it is determined whether or not the integrated value Qa is greater than the integrated air volume value threshold 2 QTHRSH2. If the value is greater than QTHRSH2, in step 2816, determination signal 3 is set at "1." After that, in step 2817, a selector is specified based on the values of the determination signals 1 to 3, and in step 2818, the control which corresponds to the selector is selected.

Figure 29:
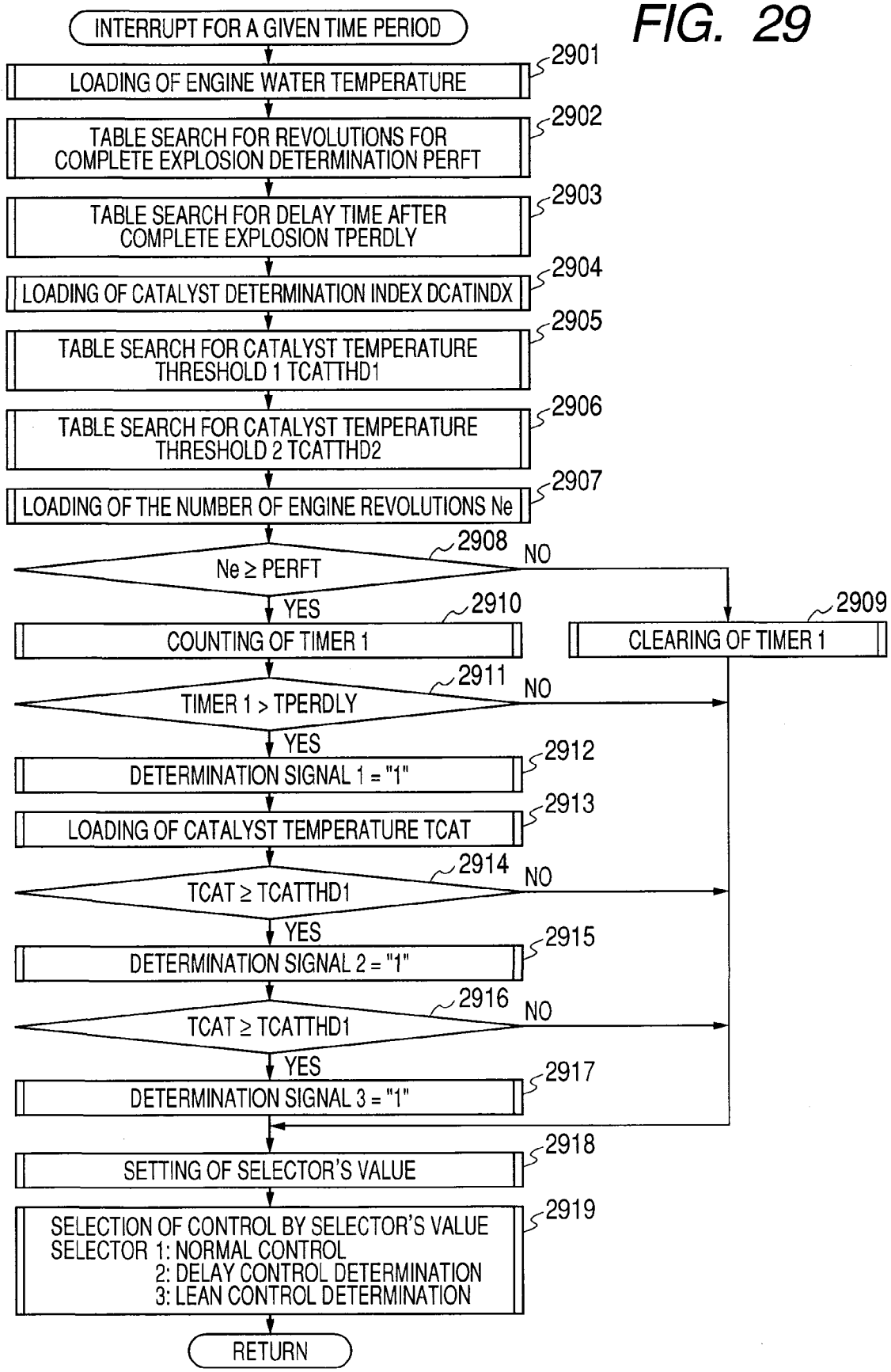
FIG. 29 shows a detailed example of a control block that executes the determination of the air-fuel ratio/ignition switchover shown in FIG. 19.

FIG. 29 shows a detailed example of a control block that executes the determination of the air-fuel ratio/ignition switchover shown in FIG. 19. In step 2901, the engine water temperature is loaded. In step 2902, a table search for the revolutions for complete explosion determination PERFT is executed according to the engine water temperature. In step 2903, a table search for the delay time after complete explosion TPERDLY is executed according to the engine water temperature. In step 2904, catalyst deterioration index DCATINDX is loaded. In step 2905, the catalyst temperature threshold 1 TCATTHD1 is searched according to the catalyst deterioration index DCATINDX. In step 2906, the catalyst temperature threshold 2 TCATTHD2 is searched according to the catalyst deterioration index DCATINDX. In step 2907, the engine revolutions Ne is loaded. In step 2908, it is determined whether or not the engine revolutions Ne is greater than the revolutions for complete explosion determination PERFT. If Ne is not greater than PERFT, timer 1 is initialized in step 2909. If Ne is greater than PERFT, timer 1 is counted up in step 2910, and in step 2911, it is determined whether or not the value of timer 1 is greater than the delay time after complete explosion TPERDLY. If the timer value is greater than TPERDLY, in step 2912, determination signal 1 is set at "1," and in step 2913, the catalyst temperature TCAT is loaded. In step 2914, it is determined whether or not the catalyst temperature TCAT is greater than the catalyst temperature threshold 1 TCATTHD1. If the value is greater than TCATTHD1, in step 2915, determination signal 2 is set at "1." In step 2916, it is determined whether or not the catalyst temperature TCAT is greater than the catalyst temperature threshold 2 TCATTHD2. If the value is greater than TCATTHD2, in step 2917, determination signal 3 is set at "1." After that, in step 2918, a selector is specified based on the values of the determination signals 1 to 3, and in step 2919, the control which corresponds to the selector is selected.

Figure 30:
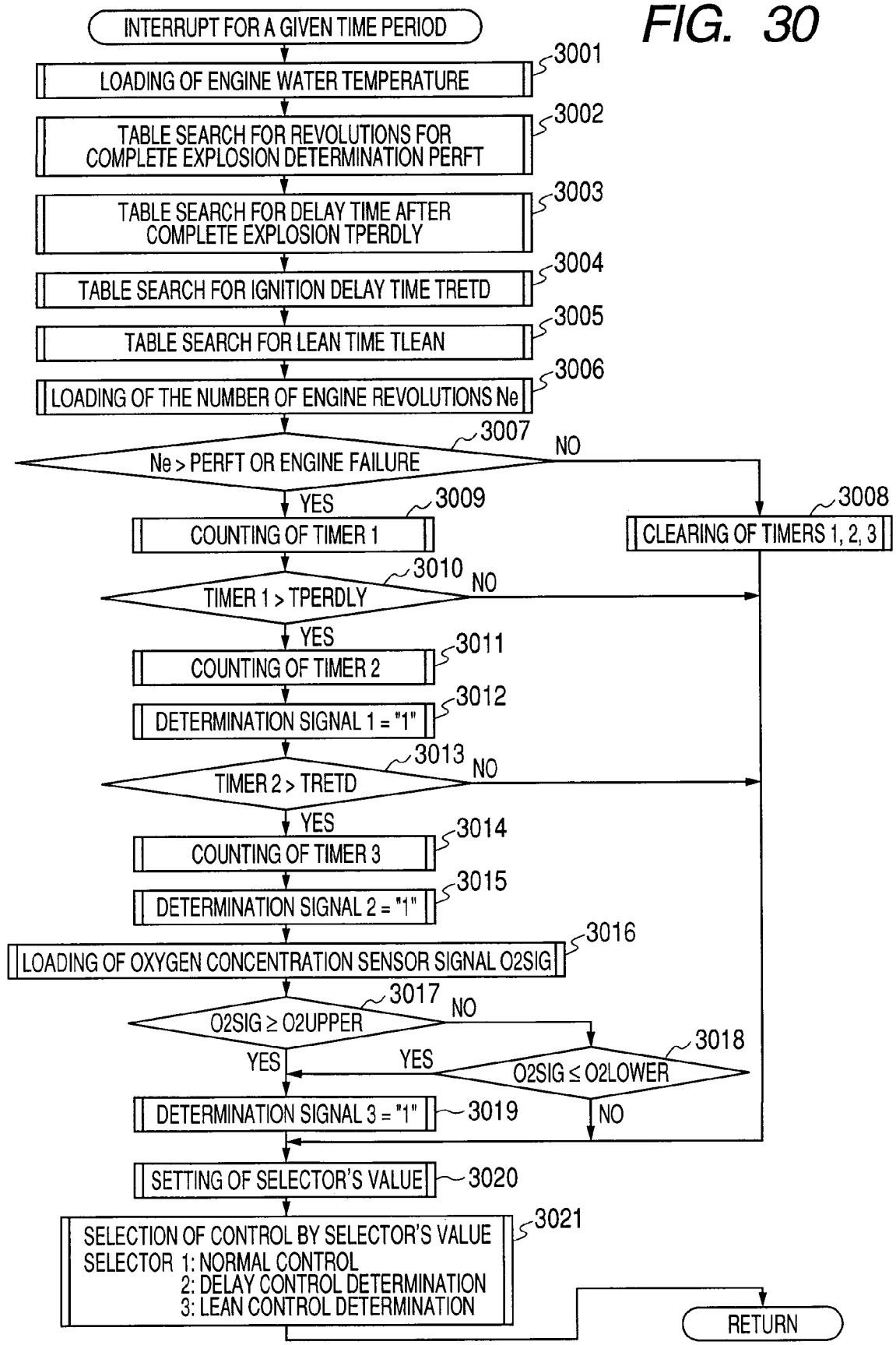
FIG. 30 shows an example in which the determination of determination signal 3 shown in FIG. 20 is applied to the flow chart shown in FIG. 27.

FIG. 30 shows an example in which the determination of determination signal 3 shown in FIG. 20 is applied to the flow chart shown in FIG. 27. From step 3001 to step 3015, the flow is the same as the example shown in FIG. 20. In step 3016, oxygen concentration sensor signal O2SIG is loaded. In step 3017 and step 3018, it is determined whether the oxygen concentration sensor signal O2SIG is greater than O2UPPER or less than O2LOWER. If that is the case, determination signal 3 is set at "1." After that, in step 3020, a selector is specified based on the values of the determination signals 1 to 3, and in step 3021, the control which corresponds to the selector is selected.

What is claimed is:

1. A fuel control system, comprising:
an engine control device that sets a normal ignition timing and a delay-side ignition timing as an ignition timing in a warm-up period after an engine has started; and
a fuel control device that sets a normal air-fuel ratio and a lean air-fuel ratio as an air-fuel ratio applied after the engine has started;
wherein the engine and fuel control devices drive the engine using the delay-side ignition timing and the normal air-fuel ratio from right after the engine has started until a spot, which is to become a pilot burner for a catalyst, is ignited, and drive the engine using the normal ignition timing and the lean air-fuel ratio after the spot, which is to become the pilot burner for said catalyst, is ignited.

2. The fuel control system according to claim 1, wherein said catalyst is determined to have been activated by comparing output voltage of an oxygen concentration sensor provided in an exhaust pipe with a prescribed threshold.

3. The fuel control system according to claim 1, further comprising wherein the ignition timing and the air-fuel ratio are changed along an equivalent idle speed control air volume line during operation of the fuel control system.

4. The fuel control system according to claim 1, wherein the spot which is to become a pilot burner for said catalyst is determined to have been ignited according to elapse of a first prearranged time after the engine has started.

5. The fuel control system according to claim 4, wherein said catalyst is determined to have been activated according to elapse of a second prearranged time after it has been determined that the spot which is to become a pilot burner for said catalyst has been ignited.

6. The fuel control system according to claim 1, wherein the spot which is to become a pilot burner for said catalyst is determined to have been ignited by comparing an integrated value of a volume of intake air of the engine after the engine has started with a first prescribed value.

7. The fuel control system according to claim 6, wherein said catalyst is determined to have been activated by comparing the integrated value of the volume of intake air of the engine after the engine has started with a second prescribed value.

8. The fuel control system according to claim 1, wherein the spot which is to become a pilot burner for said catalyst is determined to have been ignited by comparing a catalyst temperature with a predetermined first temperature threshold.

9. The fuel control system according to claim 8, wherein the first temperature threshold is determined based on a catalyst deterioration index.

10. The fuel control system according to claim 8, wherein said catalyst is determined to have been activated by comparing the catalyst temperature with a second temperature threshold which is higher than the first temperature threshold.

11. A fuel control method, which comprises the steps of:
setting a normal ignition timing and a delay-side ignition timing as an ignition timing in a warm-up period after an engine has started;
setting a normal air-fuel ratio and a lean air-fuel ratio as an air-fuel ratio applied after the engine has started;
driving the engine using the delay-side ignition timing and the normal air-fuel ratio from right after the engine has started until a spot, which is to become a pilot burner for a catalyst is ignited, and
driving the engine using the normal ignition timing and the lean air-fuel ratio after the spot, which is to become a pilot burner for said catalyst, is ignited.

12. The fuel control method according to claim 11, which comprises the further step of continuing drive of the engine using the normal ignition timing and the lean air-fuel ratio.

* * * * *